United States Patent [19]

Kato et al.

[11] Patent Number: 5,447,815
[45] Date of Patent: Sep. 5, 1995

[54] DEVELOPER FOR DEVELOPING ELECTROSTATIC IMAGE AND IMAGE FORMING METHOD

[75] Inventors: Masayoshi Kato, Iruma; Koichi Tomiyama, Kawasaki; Hiroshi Yusa, Machida, all of Japan

[73] Assignee: Canon Kabushiki Kaisha, Tokyo, Japan

[21] Appl. No.: 70,844

[22] Filed: Jun. 3, 1993

[30] Foreign Application Priority Data

Jun. 4, 1992 [JP] Japan ................................. 4-168245

[51] Int. Cl.⁶ ................................................ G03G 9/10
[52] U.S. Cl. ..................................... 430/110; 430/111; 430/126
[58] Field of Search ................. 430/109, 110, 112, 126

[56] References Cited

U.S. PATENT DOCUMENTS

| | | | |
|---|---|---|---|
| 2,221,776 | 11/1940 | Carlson | 95/5 |
| 2,297,691 | 10/1942 | Carlson | 95/5 |
| 2,618,552 | 11/1952 | Wise | 95/1.9 |
| 2,874,063 | 2/1959 | Greig | 117/17.5 |
| 3,666,363 | 5/1972 | Tanaka et al. | 355/17 |
| 3,909,258 | 9/1975 | Kotz | 96/1 R |
| 4,071,361 | 1/1978 | Marushima | 96/1.4 |
| 5,202,213 | 4/1993 | Nakahara et al. | 430/110 |
| 5,215,845 | 6/1993 | Yusa et al. | 430/106.6 |
| 5,306,588 | 4/1994 | Tanaka et al. | 430/110 |

FOREIGN PATENT DOCUMENTS

| | | | |
|---|---|---|---|
| 42-23910 | 11/1967 | Japan | . |
| 43-24748 | 10/1968 | Japan | . |
| 46-5782 | 12/1971 | Japan | . |
| 48-47345 | 7/1973 | Japan | . |
| 48-47346 | 7/1973 | Japan | . |
| 54-42121 | 4/1979 | Japan | G11B 5/42 |
| 55-18656 | 2/1980 | Japan | G03G 13/08 |
| 59-46664 | 3/1984 | Japan | G03G 15/16 |
| 63-139367 | 6/1988 | Japan | G03G 9/08 |
| 63-139369 | 6/1988 | Japan | G03G 9/08 |

*Primary Examiner*—John Goodrow
*Attorney, Agent, or Firm*—Fitzpatrick, Cella, Harper & Scinto

[57] ABSTRACT

A developer for developing an electrostatic image, comprising a toner and treated fine powder which has been treated with silicone oil or silicone varnish, wherein the treated fine powder has a specific surface area which is 0.4 to 0.8 time as large as the specific surface area of untreated fine powder.

44 Claims, 5 Drawing Sheets

DEVELOPER FOR DEVELOPING ELECTROSTATIC IMAGE AND IMAGE FORMING METHOD

BACKGROUND OF THE INVENTION

1. Field of the Invention

The present invention relates to a developer for visualizing an electrostatic image for use in an image forming method such as an electrophotography, an electrostatic recording method or an electrostatic printing method and an image forming method. More particularly, the present invention relates to a developer for use in electrophotography that can be strongly and uniformly charged and therefore enables a direct or indirect electrophotograph development method to form a high quality image that does not depend on the environment and an image forming method using the developer of the foregoing type.

2. Related Background Art

Hitherto, a variety of electrophotography methods have been known as exemplified by specifications of U.S. Pat. No. 2,297,691, Japanese Patent Publication No. 42-23910 (U.S. Pat. No. 3,666,363) and Japanese Patent Publication No. 43-24748 (U.S. Pat. No. 4,071,361) and so forth. As a general rule, the electrophotography comprises steps of forming an electric latent image on a photosensitive member by various means, developing the latent image by using developing power (hereinafter called a "toner"), transferring a toner image to a transfer medium such as paper if necessary, and heating and/or applying pressure or by using vapor of a solvent to fix the transferred image so that a copy is obtained.

If the method includes the process for transferring the toner image, a process is usually included for removing residual toner on the photosensitive member.

The development methods for visualizing the electric latent image by using a toner are exemplified by a magnetic brush method disclosed in, for example, U.S. Pat. No. 2,874,063, a cascade development method disclosed in U.S. Pat. No. 2,618,552 and a granule cloud method disclosed in U.S. Pat. No. 2,221,776. The methods using a magnetic toner are exemplified by a magne-dry method disclosed in U.S. Pat. No. 3,909,258 which uses a conductive toner, a method that makes use of dielectric polarization of toner particles, and a method as disclosed in Japanese Patent Application Laid-Open No. 54-42121 and Japanese Patent Application Laid-Open No. 55-18656 that develops a latent image by flying toner particles against the latent image.

A suggestion has been made about an arrangement of a conventional image forming apparatus including a process for electrostatically transferring a toner image, which is formed on the surface of a latent-image carrier (a photosensitive member) and can be transferred, to a paper sheet or plastic sheet transfer material, the arrangement being made so that: an image carrier formed into a rotative cylinder or an endless belt to be capable of running in an endless manner is used; and a transfer device, to which a bias is applied, is forcibly brought into contact with the image carrier to cause the transfer medium to pass through between the transfer device and the image carrier so that the toner image on the latent-image carrier is transferred to the transfer medium (an apparatus of a type disclosed in, for example, Japanese Patent Application Laid-Open No. 59-46664).

An apparatus of the foregoing type is able to enlarge the adsorption area, on which the transfer medium is adhered to the latent-image carrier, by adjusting the pressure of the transfer roller to press the latent-image carrier in contrast with a known conventional transfer means which makes use of corona discharge. Furthermore, the transfer medium is positively pressed and held at the transference position. Therefore, deviation of transference can be eliminated, the deviation occurring due to defective synchronization (or poor synchronism) caused from a transfer-medium conveyance means or due to a loop or a curl present in the transfer medium. As a result, the foregoing apparatus is able to easily meet recent desires of shortening the conveyance passage for the transfer medium and reducing the size of the latent-image carrier, the desires resulting from a tendency to reduce the size of an image forming apparatus of the foregoing type. However, since an apparatus of the type of transferring the toner image by utilizing the contact is supplied with a transference electric current from the contact position, it is necessary to apply a certain pressure to the transference device. If the contact pressure is applied, the toner image on the latent-image carrier is also pressed. In this case, the toner is subject to agglomeration.

If the surface of the latent-image carrier is made of resin, close contact occurs between the toner aggregates and the latent-image carrier. Therefore, the shift to the transfer medium is obstructed, and a phenomenon occurs that no toner image is transferred in a portion, in which a firm contact is realized, and a lack of image formation takes place.

The foregoing phenomenon becomes excessive in a 0.1 to 2 mm-line portion. The reason for this will now be described. An edge phenomenon causes the toner to be placed in the line portion in a large quantity and, accordingly, the agglomeration of toner particles is liable to occur due to the applied pressure. Therefore, a lack of image formation easily takes place at the time of the transference. The transferred image formed at this time is a copy having only the outline which is called "transfer hollow". FIG. 1A illustrates a normal image in which no hollow takes place, and FIG. 1B illustrates an image in which the transfer hollow has occurred.

In particular, the lack of an intermediate portion occurring in transference easily takes place with a thick paper sheet of 100 g/cm$^2$ or thicker and a transparency film and the like. It can be considered that the transfer hollow easily occurs because the transfer mediums such as the thick paper sheet and the film have a large thickness and, accordingly, the effect of the transferring electric field is restricted and the pressure application is enhanced.

Therefore, the transfer device comprising the contact member enables a multiplicity of advantages to be obtained in that the size and electric power can be reduced. However, it suffers from a tendency that the requirements for the transfer medium are made more severe.

Hitherto, a corona discharger has been known as a charging means for the electrophotographic apparatus. However, the corona discharger encounters problems that high voltage must be applied and an excessively large quantity of ozone is generated.

Accordingly, an investigation has been performed recently that no corona discharger is used but a contact charger is utilized. Specifically, voltage is applied to a conductive roller serving as the charging member and the conductive roller is brought into contact with a photosensitive member serving as a member to be charged to charge the surface of the photosensitive member to a predetermined potential. By using a contact charging means of the foregoing type, the voltage can be lowered and the quantity of generated ozone can be reduced.

For example, Japanese Patent Publication No. 50-13661 has disclosed a structure using a roller comprising a core metal covered with a dielectric member made of nylon or polyurethane rubber to lower the voltage required to be applied at the time of charging the photosensitive paper.

However, the foregoing case of using the contact charging means, poses a problem that insufficient contact with the member to be charged causes poor charging. Further, the contact area raises a problem that the residual developer on the surface of the photosensitive member is allowed to adhere firmly to the surface of the charging member and the photosensitive member because the charging member is in contact with the photosensitive member under a predetermined level of pressure. As a result, the image is affected adversely.

A contact charging device of the foregoing type comprises a charging member applied with DC voltage or voltage obtained by superimposing AC voltage on DC voltage. At this time, abnormal charging and flying motion of residual developer having very small particle size and light weight are repeated in the portion in the vicinity of the area in which the charging member and the photosensitive drum are in contact with each other. Therefore, the residual developer can easily be electrostatically adsorbed and embedded into the surface of the charging member and the photosensitive drum. The foregoing state is considerably different from the state realized when a non-contact charging means is employed in a conventional corona discharger.

The foregoing development method uses fine powder prepared by dispersing dye or pigment in natural or synthetic resin. For example, particles obtained by pulverizing substances, in which coloring agent is dispersed in binding resin, such as polystyrene, to about 1 to 30 μm are used as toner particles. As the magnetic toner, a substance containing magnetic particles, such as magnetite is used. If a two-component-type developer is used, toner is usually mixed with carrier particles, such as glass beads or ferrite particles.

In recent years, small and low-cost copying machines and laser printers for personal use have been developed, and small-size machines of the foregoing type employ a cartridge system constituted by integrating the photosensitive member, the developer and a cleaning device and the like in order to make the machines to be maintenance-free structures. Further, it is advantageous that a mono-component magnetic developer is used because the structure of the developing device can be simplified.

In order to form a visible image exhibiting an excellent image quality by the method that uses the foregoing dry developer, it is necessary for the developer to have excellent fluidity and uniform charging facility. Accordingly, silica fine powder have been added and mixed with toner powder. Since the silica fine powder are hydrophilic as it is, the developer, to which the silica fine powder are added causes agglomeration due to moisture in air and, in an excessive case, the silica fine powder absorbs moisture causing the charging performance of the developer to deteriorate. Therefore, use of silica fine powder which have been subjected to a hydrophobic process has been suggested in Japanese Patent Application Laid-Open No. 46-5782, Japanese Patent Application Laid-Open No. 48-47345 and Japanese Patent Application Laid-Open No. 48-47346 and so forth. Specifically, the disclosed method comprises steps of allowing silica fine powder and silane coupling agent to react with each other and using an organic acid to make the silanol group in the surface of the silicic acid granule to be hydrophobic. As the silane coupling agent, dimethyldichlorosilane or trimethylalkoxysilane or the like has been used.

In order to fully perform a hydrophobicity imparting treatment, a method comprising steps of subjecting silica fine powder to a process in which a silane coupling agent is used, and subjecting it to a process in which silicone oil of $A/25 \pm A/30$ parts by weight (A: the specific surface area of silica fine powder) is used so that silica fine powder having the hydrophobic ratio (or a degree of imparting hydrophobicity) of 90% or more is used, has been suggested in Japanese Patent Application Laid-Open No. 63-139367 and Japanese Patent Application Laid-Open No. 63-139369.

However, a developer of the type such as the foregoing silica fine powder manufactured by adding inorganic fine powder to the toner rubs the surface of the photosensitive member at the time of forming an image because the developer has a considerable grinding effect. Therefore, there arise problems that the surface of the photosensitive member is ground or damaged and that fusing of the residual developer and filming occurs due to the damage. The foregoing problems is liable to arise with the transfer device having the foregoing contact portion and with the foregoing charging member using the contact member which is in contact with the surface of the photosensitive member under a predetermined contact pressure.

Recently, the particle size of the toner has been reduced in order to improve the quality of copied images. Therefore, the uniform charge of toner has become difficult as compared with the conventional structures. With the tendency of the reduction in the particle size of the toner, the surface area of the toner per unit weight increases. Therefore, the probability for the toner particles to be brought into close contact has been raised. Further, in order to keep high fluidity of the toner, it is necessary that the inorganic powder is added to and mixed with the toner in a quantity larger than the quantity required for the conventional structure. Therefore, the foregoing problems become more critical.

In order to prevent the foregoing problems, it is effective to increase a fluidity-enhancing agent such as silica fine powder. However, when the foregoing toner is used in a machine exhibiting a high processing speed, the surface of the photosensitive member tends to be damaged and the fixing property of the toner deteriorates, and, accordingly, the increase is limited to a certain degree.

Recently, a problem of waste has become critical, causing residual toner on the photosensitive member in the process of transferring the toner image to be removed and recovered. The quantity of the toner, that is the subject of the recovery, must be reduced. In particular, the quantity of the toner which is made to have a fine particle size must be reduced while improving the uniformly charging ability of the toner.

SUMMARY OF THE INVENTION

An object of the present invention is to provide a developer and an image forming method capable of overcoming the foregoing problems.

An object of the present invention is to provide a developer for developing an electrostatic image that is stable even if the environment is changed to high temperature and high humidity or low temperature and low humidity state and that is able to always exhibit excellent characteristics.

Another object of the present invention is to provide a developer for use in electrophotography comprising development, fixing and cleaning processes, the developer exhibiting excellent durability because an image can be obtained stably for a long time even after a multiplicity of images have been formed.

Another object of the present invention is to provide a developer which is capable of overcoming various problems experienced with a conventional charge-type toner, which can be charged uniformly and strongly and which visualizes an electrostatic image to form a high quality image while preventing fog and flying of toner to the portion including edges.

In particular, it is another object to provide a developer enabling a high quality image to be formed and exhibiting excellent development properties, by uniformly and intensely charging a toner which has been made to have a fine particle size.

Another object of the present invention is to provide an image forming method of a type utilizing pressure transfer such as a contact transfer method that has a transfer process which gives a high quality image faithful to a latent image regardless of the conditions of a transfer medium.

Another object of the present invention is to provide an image forming method capable of inhibiting the "transfer hollow" phenomenon from occurring.

Another object of the present invention is to provide an image forming method which uses a toner enabling a high quality image to be formed while inhibiting occurrence of the transfer hollow even if a thick transfer medium is used.

Another object of the present invention is to provide an image forming method having a charging process in which damage and undesirable cuts by a developer of the surface of the charging member and a member to be charged and contamination such as fixation of the developer are prevented to satisfactorily maintain the contact between the charging member and the member to be charged to prevent defective charge and non-uniform charge.

An object of the present invention is to provide a developer for developing electrostatic images, comprising a toner and treated fine powder which has been treated with silicone oil or silicone varnish, wherein said treated fine powder has a specific surface area which is from 40% to 80% the specific surface area of untreated fine powder.

An object of the present invention is to provide an image forming method, comprising:
  charging an electrostatic image carrier;
  forming an electrostatic image on the charged electrostatic image carrier;
  developing the electrostatic image with a toner to form a toner image; and
  transferring the toner image to a transfer medium by transfer means which is being pressed against the electrostatic image carrier under a line pressure of 3 g/cm or more while interposing a transfer medium therebetween,
  wherein the developer comprises a toner and treated fine powder which has been treated with silicone oil or silicone varnish,
  said treated fine powder having a specific surface area which is from 40% to 80% the specific area of untreated fine powder.

An object of the present invention is to provide an image forming method, comprising:
  bringing a charging member into contact with an electrostatic image carrier;
  applying voltage to the charging member from outside to charge the electrostatic image carrier;
  forming an electrostatic image on the charged electrostatic image carrier;
  forming a toner image by developing the electrostatic image with a developer;
  transferring the toner image from the electrostatic image carrier to a transfer medium; and
  cleaning the transferred electrostatic image carrier,
  wherein the developer comprises a toner and treated fine powder which has been treated with silicone oil or silicone varnish,
  said treated fine powder having a specific surface area which is from 40% to 80% the specific area of untreated fine powder.

DETAILED DESCRIPTION OF THE INVENTION

Inventors of the present invention have investigated various kinds of fine powder, and reached the conclusion that the use of fine powder having been treated with silicone oil or silicone varnish so that the ratio of the specific surface area of treated fine powder to the specific surface area of untreated fine powder is in a limited range, enables a developer exhibiting excellent characteristics to be obtained.

The present invention is based upon the discovery that control of the physical properties of fine powder in a pretreated state, particularly the surface characteristics, to a state different from the known condition enables the state treated with silicone oil or silicone varnish to be made further uniform, and the characteristics of a developer using such fine powder can be further improved.

In the present invention, the line pressure is calculated by using the following equation:

line pressure (g/cm) = total pressure applied to a transfer medium (g)/length of contact (cm)

If the pressure of contact is lower than 3 g, deviation of the transfer medium occurs and the result of the transfer becomes defective due to a want of a transferring electric current. It is preferable that the line pressure is 20 g or more.

Figure 1A:
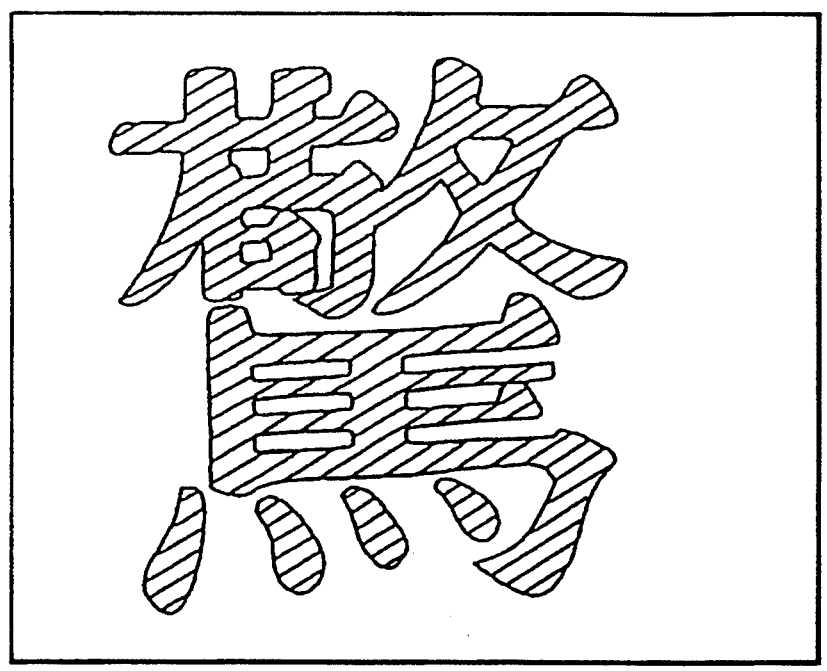
FIGS. 1A and 1B schematically illustrate a toner image for explaining a "transfer hollow" state.
Figure 1B:
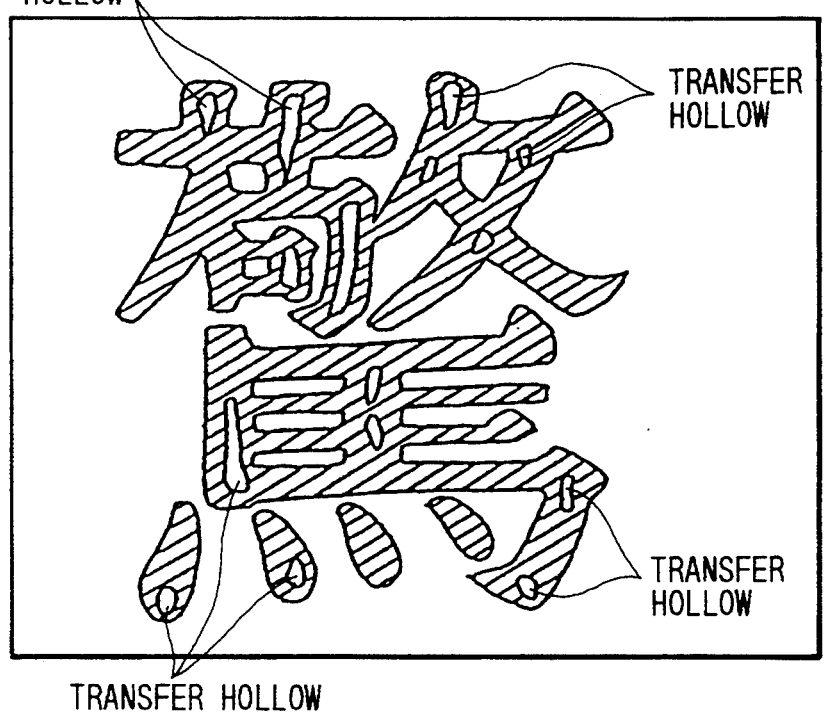
Figure 2:
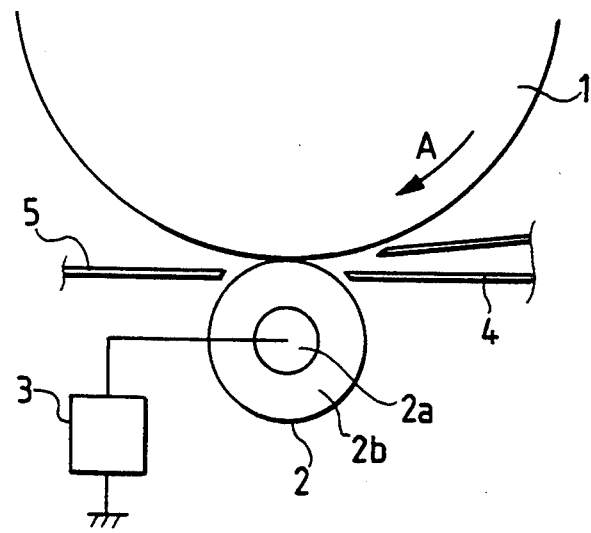
FIG. 2 is a schematic structural view which illustrates an example of a transfer device for use in an image forming method according to the present invention.
Figure 3:
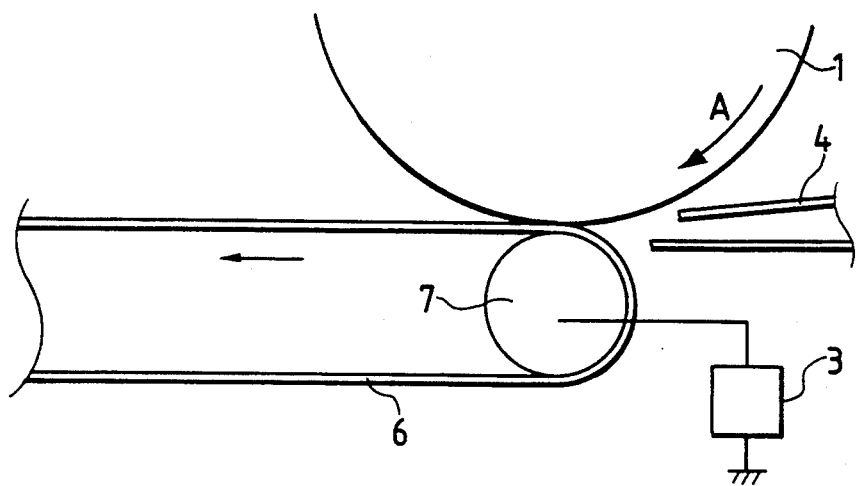
FIG. 3 is a schematic structural view which illustrates another example of a transfer device for use in the image forming method according to the present invention.

As the transfer device for use in the present invention, a transfer roller as shown in FIG. 2 or a transfer belt as shown in FIG. 3 is exemplified. FIG. 2 is a schematic structural view of an essential portion of an image forming apparatus of the foregoing type. The illustrated apparatus comprises a cylindrical electrostatic image carrier 1 (hereinafter called a "photosensitive member") extending in a direction perpendicular to the drawing sheet and rotating in a direction designated by an arrow A and a conductive transfer roller 2 in contact with the photosensitive member 1.

Further, the following elements (omitted from illustration), which are required to form an image, are disposed around the photosensitive member 1: a primary charger for uniformly charging the surface of the photosensitive member 1, an exposure portion for projecting an optical image of an image-modulated laser beam or light reflected from an original document onto the charged surface to make the potential of the subject portion to decline so as to form an electrostatic latent image, a developing device, a cleaner for removing residual toner on the surface of the photosensitive member after the image has been transferred and so forth.

The transfer roller 2 comprises a core 2a and a conductive and elastic layer 2b. The conductive and elastic layer 2b is made of an elastic material made of polyurethane or EPDM (Ethylene Propylene rubber), in which a conductive substance such as carbon is dispersed, and having a volume resistance of about $10^6$ to $10^{10}$ W·cm. A bias from a constant-voltage power source 3 is applied to the core metal 2.

To the core 2a is applied a bias from a constant-voltage power source 8. It is preferable that the bias conditions be as follows: electric current is 0.1 to 50 $\mu$A and voltage (absolute value) is 100 to 5000 V (preferably 500 to 4000 V).

FIG. 3 illustrates the present invention to which a transfer belt is applied. The transfer belt 6 is supported and driven by a conductive roller 7. The application of the pressure to transfer roller is usually performed by applying pressure to the end bearing of the core 2a.

A contact charging process applicable to the image forming method according to the present invention will be specifically described below.

Figure 4:
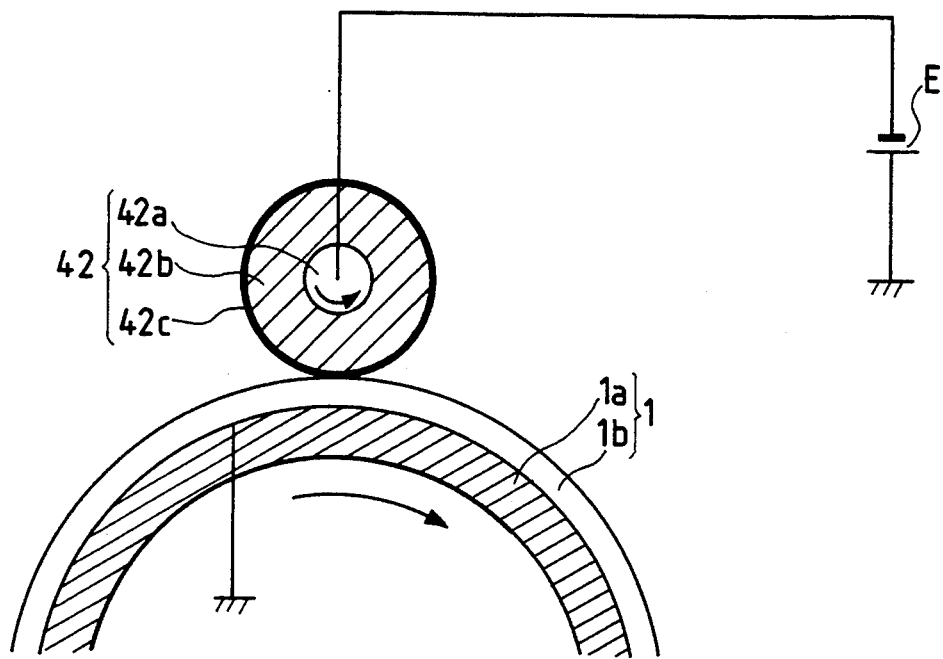
FIG. 4 and FIG. 6 are schematic structural views which illustrate an example of a contact charging device for use in the image forming method according to the present invention.

FIG. 4 is a schematic structural view which illustrates a contact charging device according to an embodiment of the present invention. Reference numeral 1 represents a photosensitive drum which is a member to be charged, the photosensitive drum 1 being constituted by forming an organic photoconductive member (OPC) 1b, which is a photosensitive layer, on the outer peripheral surface of an aluminum drum base 1a. The photosensitive drum 1 is rotated at a predetermined speed in a direction designated by an arrow. In this embodiment, the phtosensitive drum 1 has an outer diameter of 30 mm$\phi$. Reference numeral 42 represents a charging roller which is brought into contact with the photosensitive drum 1 under a predetermined pressure and which is a charging member. The charging roller 42 comprises a conductive rubber layer 42b formed on a metal core 42a and a surface layer 42c formed on the periphery of the conductive rubber layer 42b, the surface layer 42c being a release coating. The surface layer according to this embodiment is a release coating so that it is preferably applicable to the image forming method according to the present invention. However, if the resistance is too large, the release coating causes the photosensitive drum 1 not to be charged. If the resistance is too small, excessively high voltage is applied to the photosensitive drum 1. Therefore, damage of the drum and pinholes are liable to occur. It is preferable that the volume resistivity of the release coating is $10^9$ to $10^{14}$ W·cm. It is preferable that the thickness of the release coating is 3.0 $\mu$m or less. The lower limit of the coating is determined so that the coating is not separated and turned up. The lower limit is about, for example, 5 $\mu$m.

In this embodiment, the outer diameter of the charging roller 42 is 12 mm$\phi$, the conductive rubber layer 42b is made of EPDM and the surface layer 42c is made of nylon-type resin having a thickness of 10 $\mu$m. The hardness of the charging roller 42 is made to be 54.5° (ASKER-C). Symbol E represents a power source for applying voltage to the charging roller 42 in such a manner that a predetermined voltage is supplied to the core 42a of the charging roller 42. Referrring to FIG. 4, symbol E represents a DC voltage. It is preferable that E is determined to superpose AC voltage on DC voltage.

Preferable processing conditions in this case are as follows:

| Pressure of contact: | 5 to 500 g/cm |
| --- | --- |
| AC voltage: | 0.5 to 5 Vpp |
| AC frequency: | 50 to 3000 Hz |
| DC voltage: | −200 to −900 V |

Figure 5:
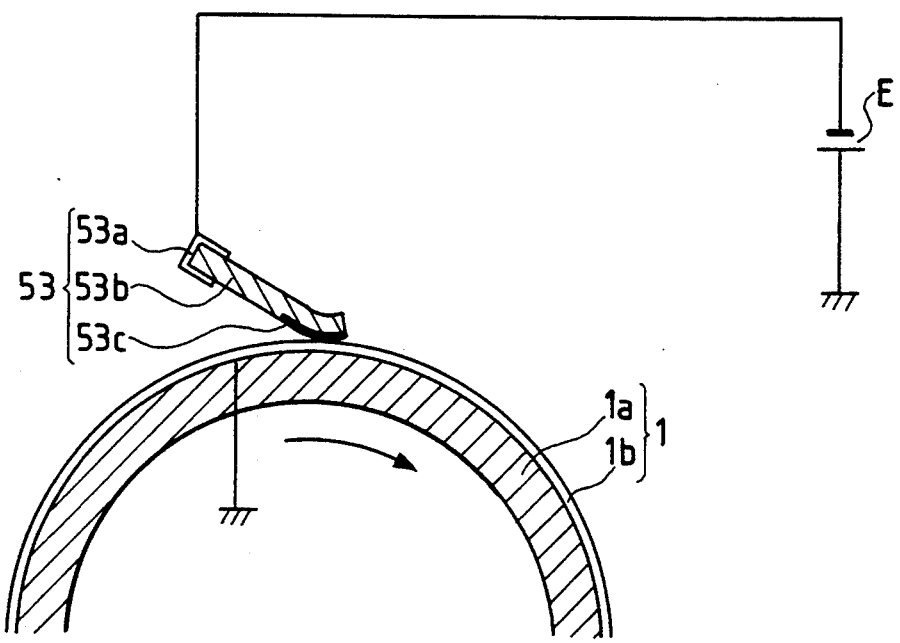
FIG. 5 is a schematic structural view which illustrates another example of the contact charging device for use in the image forming method according to the present invention.
Figure 6:
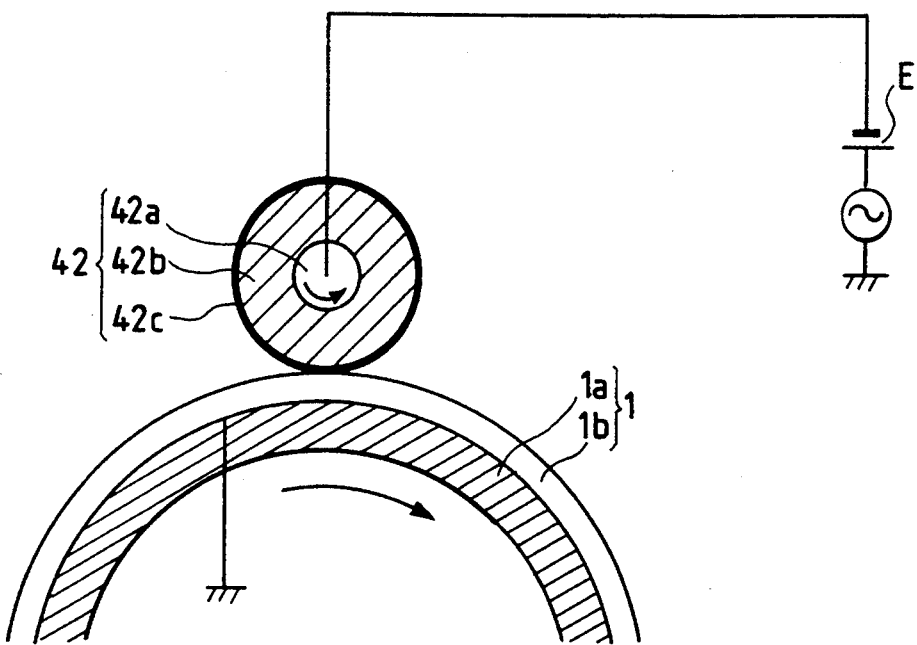

FIG. 5 is a schematic structural view of a contact charging member according to another embodiment of the present invention. The common members to those of the apparatus shown in FIG. 4 are given the same reference numerals and their descriptions are omitted.

A contact charging member 53 according to this embodiment is formed into a blade shape which is brought into contact with the photosensitive drum 1 under a predetermined pressure in the forward direction. The blade 53 comprises a conductive rubber 53b supported on a metal supporting member 53a, to which voltage is supplied. A portion in contact with the photosensitive drum 1 has a surface layer 53c formed thereon to serve as a release coating. The surface layer 53c is made of 10 $\mu$m nylon. According to this embodiment, a similar effect to that obtainable from the foregoing embodiment can be obtained while preventing occurrence of a problem of adhesion of the blade and the photosensitive drum.

Although the foregoing embodiment comprises the roller or blade charging member, the present invention is not limited to the foregoing embodiment. Other shapes may also be employed.

Although the charging member is composed of the conductive rubber layer and the release coating, a high-resistance layer (for example, a epichloro hydryne rubber layer which is stable to environmental change) may be interposed between the conductive rubber layer and the separation-type coating film surface layer to prevent leak to the photosensitive member.

As an alternative to the nylon type resin employed to form the release coating, PVDF (polyvinylidine fluoride) or PVDC (polyvinylidine chloride) may be used. The photosensitive member may be made of amorphous silicon, selenium or ZnO or the like. Particularly in the case where amorphous silicon is employed to form the photosensitive member, smeared image becomes excessive if a softening agent of the conductive rubber layer adheres to the photosensitive layer even in a small amount, as compared with another case. Therefore, an excellent effect can be obtained from the insulating coating formed on the outside of the conductive rubber layer.

A cleaning process according to the present invention will be described below. The photosensitive drum, to which a toner image has been transferred, is usually cleaned up by a cleaning member such as a blade or a roller to remove residual toner or another contamination substance. As a result, the photosensitive drum has a clean surface so as to be repeatedly used to form images.

The foregoing cleaning process may be performed simultaneously with the charging process or the developing process or the transfer process of the electrophotography while being included in the foregoing process.

The present invention is particularly effective to an image forming apparatus in which the surface of a photosensitive member is made of an organic compound. If the organic compound forms the surface layer, it is liable to undesirably be bonded to the binding resin contained in the toner. The present invention is able to inhibit such a problem satisfactorily.

The surface substance of the photosensitive member according to the present invention may be a material selected from a group consisting of silicon resin, vinylidine chloride resin, ethylene-vinyl chloride vinyl resin, styrene-methylmethacrylate resin, styrene-acrylonitryl resin, styrene resin, polyethylene terephthalate, polycarbonate and the like. However, the present invention is not limited to those materials. Another monomer or a copolymer or a mixture of the foregoing resins may be used.

The present invention is particularly effective where it is applied to an image forming apparatus having a small-diameter photosensitive drum, the diameter of which is 50 mm or less. In the case of the small-diameter photosensitive drum, since curvature is large even if the line pressure is the same, concentration of pressure tends to occur in the contact portion and the surface of the photosensitive drum is liable to be damaged. However, the present invention is able to satisfactorily prevent occurrence of such a problem.

It can be considered that the same phenomenon occurs with a belt photosensitive member and, accordingly, the present invention is effective when applied to an image forming apparatus in which the radius of curvature of the transfer portion is 25 mm or less.

The developer according to the present invention will be described below.

Silicone oil or silicone varnish treatment, to which the developer according to the present invention is subjected, causes silicone oil or silicone varnish to be uniformly applied to the surfaces of fine powder particles. As a result, the surfaces can be completely covered with it so that moisture resistance can be improved significantly.

Since the fine powder according to the present invention is subjected to silicone oil or silicone varnish treatment, it is negatively charged strongly. Therefore, the fine powder enables the developer to have a strong negative charging property when it is added to the developer. Such a property is effective for a one-component magnetic toner which is subject to unstable charge. In particular, it is effective for a toner which is made to have a small particle size in order to improve the image quality.

It is preferable that the fine powder according to the present invention is made of an inorganic compound, For example, it is preferable to employ fine powder of group III or group IV metal oxide such as silica, alumina, titanium oxide or the like. Preferable fine powder includes dry silica which is called a dry method silica or fumed silica prepared by oxidizing a vapor phase silicon halogen compound and wet silica manufactured from water glass or the like. It is more preferable that the dry silica be used because it contains a smaller quantity of silanol groups on the surface and the inside of silica fine powder and the quantity of residue such as $Na_2O$ or $SO_3^{2-}$ from the manufacturing process is small. If the dry silica is employed, use of a silicon halogen compound together with another metal halogen compound such as aluminum chloride or titanium chloride in the manufacturing process enables complex fine powder composed of the silica and another metal oxide to be obtained. The complex fine powder may be employed as the dry silica. It is preferable that average primary particle size is ranged from 0.001 to 2 $\mu$m. Particularly, fine powder such as silica fine powder having a particle size of from 0.002 to 0.2 $\mu$m may be used preferably.

In order to uniformly perform the silicon oil process or the silicon varnish treatment to meet the aim of the invention, it is preferable that the foregoing fine powder are so prepared as to have a hydrophobic ratio of 70% or higher, more preferably 80% or higher.

The hydrophobic ratio of the fine powder in the present invention is measured by the following method: 100 ml of pure water and 1 g of a sample are admitted into a vessel with stopper, followed by shaking the vessel for 10 minutes by using a shaking machine. After the shaking operation has been completed, the vessel is allowed to stand. Then, the water layer is taken after the powder layer and the water layer have been separated from each other to measure transmittance by using a wavelength of 500 nm. with respect to blank pure water free of fine powder. The valve of the measured transmittance is made to be the hydrophobic ratio of fine powder.

The silicone oil or silicon varnish for use in the present invention is generally expressed by the following formula:

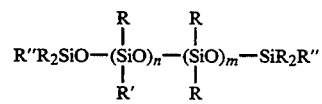

wherein R is a $C_1$ to $C_3$ alkyl group, R' is a denaturing group of silicone oil such as alkyl, halogen denatured alkyl, or substituted or unsubstituted phenyl and R" is a $C_1$–$C_3$ alkyl group or an alkoxyl group.

The silicone oil or silicone varnish includes dimethyl silicone oil, alkyl denatured silicone oil, α-methylstyrene denatured silicone oil, chlorophenyl silicone oil and fluorine denatured silicone oil and the like.

It is preferable that silicone oil having a viscosity of 50 to 1000 centistokes at 25° C. is used. If the viscosity is low and the molecular weight is too low, silicone oil sometimes generates volatile components when it is subjected to a heating process or the like. If the viscosity is high and the molecular weight is too large, the silicone oil of this type cannot easily be processed.

The silicone oil or silicone varnish treatment may be performed by a known method. For example, fine powder and silicon oil may be directly mixed by using a mixer, such as as a Henschel mixer, or silicone oil may be sprayed to the base fine powder. It is more preferable to employ a method comprising steps of dissolving or dispersing silicone oil in a proper solvent, mixing it with the base fine powder, and removing the solvent.

It is preferable that the silicone oil or silicone varnish treatment is so performed as to cause the specific surface area to be from 40% to 80% of that before the process is performed. It is more preferable that the treatment is carried out to make the quantity of adhered carbon to be 3 to 8 wt % of the fine powder. The quantity of adhered carbon is a value obtained by using an element analyzer (CHN meter), and the specific surface area is a value obtained from $N_2$-adsorption in a BET method. It is preferable that the hydrophobic ratio of the granules realized by the silicone oil or silicone varnish treatment is 80% or more, more preferably 90% or more.

In terms of transfer property, which is the most important object of the present invention, the separation facility of toner particles between toner particles developed on the surface of the photosensitive member and the surface of the latent-image carrier can be improved and the close contact of the toner particles due to external pressure can be effectively inhibited by using the fine powder treated with silicone oil or silicone varnish.

The foregoing limitation of the method of performing the foregoing process is employed because insufficient reduction in the specific surface area of fine powder occurs where the silicone oil or silicone varnish treatment is carried out insufficiently or unevenly. In such a case, the separation effect between toner particles and the surface of the photosensitive member and between toner particles deteriorates and, accordingly, the transfer property also deteriorates. In addition, the moisture resistance is unsatisfactory, causing silica fine powder to absorb moisture in a high humidity atmosphere. In this case, a high quality image cannot be obtained and the charge becomes non-uniform, resulting in that a satisfactory result cannot be realized. If it is applied to a developer having toner having a small particle size, problems arise such that the quantity of residual toner on the photosensitive member cannot be reduced in the process of transferring a toner image. If the specific surface area of fine powder has been reduced excessively, agglomerates and coalescene of silica fine powder are produced. If it is applied to a developer, the improvement in the fluidity is unsatisfactory, the development property, the transfer property and durability are affected undesirably. As a result, a satisfactory effect cannot be obtained.

If the developer according to the present invention is used, excellent transfer property can be realized and, accordingly, the transfer hollow occurring in a transparency film, which is an unsolved problem, can be satisfactorily prevented. Even if toner having a very small particle size that is disadvantage to be transferred is used, a satisfactory effect can be obtained while eliminating a necessity of enlarging the quantity of the fine powder. If an excessively large quantity is added, damage of the surface of the photosensitive drum can be reduced because the surfaces of the fine powder are almost completely treated and, accordingly, the fine powder has excellent lubricating properties.

Further, attained excellent development property, durability and stability against environment change enables an excellent image to be stably provided.

The developer of the present invention is considered to be effective for preventing toner melting to the surface of the photosensitive member in a image forming method comprising a contact charging process since the melting is considered to occur as explained below.

The adhesion of melted toner to the surface of the photosensitive member is caused by such mechanism that residual developer having a small particle size and light weight on the surface of the photosensitive member is pressed against to damage generated when the surface of the photosensitive member is rubbed by the contact charging member to which the developer escaping from the cleaning blade of the image forming apparatus comprising the contact charging device is adhered so that fixing and embedding take place.

The developer according to the present invention has the fine powder which have been sufficiently and uniformly treated with silicone oil or silicone varnish having lubricating properties. Therefore, due to the lubricating properties of the fine powder on the surface of the magnetic developer, the fine powder serves as a lubricant between the contact charging member and the photosensitive member. As a result, adhesion of melted toner can be prevented in such a manner that the surface of the photosensitive member is not damaged.

Since the developer is strongly and uniformly charged, the developer residual on the surface of the photosensitive member, which causes the foregoing problem of adhesion, can be reduced.

It is preferable that the silicone oil or silicone varnish to be admitted at the time of performing the silicone oil or silicone varnish treatment is 3 to 50 parts by weight with respect to 100 parts by weight of fine powder, more preferably 5 to 30 parts by weight.

It is preferable that the fine powder for use in the present invention is subjected to a process using a silane coupling agent to improve the hydrophobic nature, and then it is subjected to the silicone oil or silicon varnish treatment.

In general, the employment of only silicone oil or silicone varnish treatment raises the problem that aggregates of fine powder is liable to be formed during treatment if the quantity of silicone oil covering the surfaces of the fine powder is large and, accordingly, the fluidity of a developer deteriorates if it is applied to developer. Therefore, the silicone oil or silicone varnish treatment must be performed carefully. Therefore, the effect of performing the silicone oil or silicone varnish treatment can be exhibited more effectively by employing a method comprising steps of subjecting fine powder to a process using a silane coupling agent and performing a process using silicone oil or silicone varnish.

The silane coupling agent for use in the present invention is expressed by the following general formula:

$$R_m SiY_n$$

wherein R is an alkoxy group or a chlorine atom, m is an integer of 1 to 3, Y is hydrocarbon including an alkyl group, a vinyl group, a glycide group and a methacrylic group, and n is an integer of 3 to 1. The silane coupling agent includes dimethyl dichlorosilane, trimethyl chlorosilane, allyl dimethyl chlorosilane, hexamethyl disilazane, allylphenyl dichlorosilane, benzyldimethyl chlorosilane, vinyl triethoxysilane, γ-methacryloxypropyl triethoxysilane, vinyl triacetoxysilane, divinyl chlorosilane and dimethyl vinyl chlorosilane.

It is more preferable that a process using a coupling agent having a mono- or dimethyl group such as di-methyl dichlorosilane, dimethyl dimethoxysilane, monomethyl trichlorosilane or monomethyl trimethoxy silane is performed ($R-Si-Y_3$ or $R_2-Si-Y_2$), and then a process using a coupling agent having a trimethyl group such as hexamethyl disilazane, trimethyl chlorosilane or trimethyl methoxysilane is performed. As a result, the hydrophobic degree of the fine powder before the silicone oil or silicone varnish treatment is performed can be maintained at a high level, and the affinity with silicone oil or silicone varnish can be improved. Therefore, the process can be performed more uniformly.

If the silane coupling agent is used, it is preferable that the silane coupling agent is used by 2 to 30 parts by weight with respect to 100 parts by weight of fine powder more preferably 5 to 25 parts by weight.

The operation of processing fine powder with the silane coupling agent may be performed by a known method such as a dry process comprising a step of allowing the vaporized silane coupling agent to react with the fine powder formed into a cloud shape by stirring or the like or a wet method comprising a step of dispersing fine powder in a solvent and dropping and reacting the silane coupling agent.

As for the quantity of fine powder with respect to the developer, it is preferable that it is used in 0.01 to 20 parts by weight with respect to 100 parts by weight of the magnetic toner, more preferably 0.1 to 3 parts by weight.

The bonding resin for use in the present invention includes styrene such as polystyrene or polyvinyl toluene or homopolymer of its substitution product; styrene copolymer such as styrene-vinyltoluene copolymer, styrene-vinylnaphthalene copolymer, styrene-methylacrylate copolymer, styrene-ethylacrylate copolymer, styrene-butylacrylate copolymer, styrene-octylacrylate copolymer, styrene-dimethylaminoethylacrylate copolymer, styrene-methylmethacrylate copolymer, styrene-ethylmethacrylate copolymer, styrene-butylmethacrylate copolymer, styrene-dimethylaminoethylmethacrylate copolymer, styrene-vinylmethylether copolymer, styrene-vinylethylether copolymer, styrene-vinylmethylketone copolymer, styrene-butadiene copolymer, styrene-isoprene copolymer, styrene-maleic acid copolymer, styrene-maleic acid ester copolymer; polymethylmethacrylate; polybutylmethacrylate; polyvinyl acetate; polyethylene, polypropylene; polyvinyl butyral; polyacrylic acid resin; rosin; denatured rosin; terpene resin; phenol resin; aliphatic acid or alicyclic hydrocarbon resin; aromatic petroleum resin; paraffin wax; and carnauba wax.

As the coloring material that can be added to the toner according to the present invention, known pigment or dye such as carbon black or copper phthalocyanine.

If magnetic toner is used, magnetic powder of a magnetic substance selected from the following group is used together with the bonding resin: ferromagnetic metal powder of iron, cobalt or nickel; alloy or compound of magnetite, $\gamma\text{-Fe}_2O_3$ or ferrite; and other ferromagnetic alloy.

Additives may optionally be added to the toner. The additives include a lubricating agent such as teflon powder or zinc stearate powder; a fixing agent (for example, low-molecular weight polyethylene); and metal oxide powder such as tin oxide powder of a conductivity imparting agent.

As for the toner, toner powder having a weight average particle size of 3 to 15 μm is used.

Figure 7:
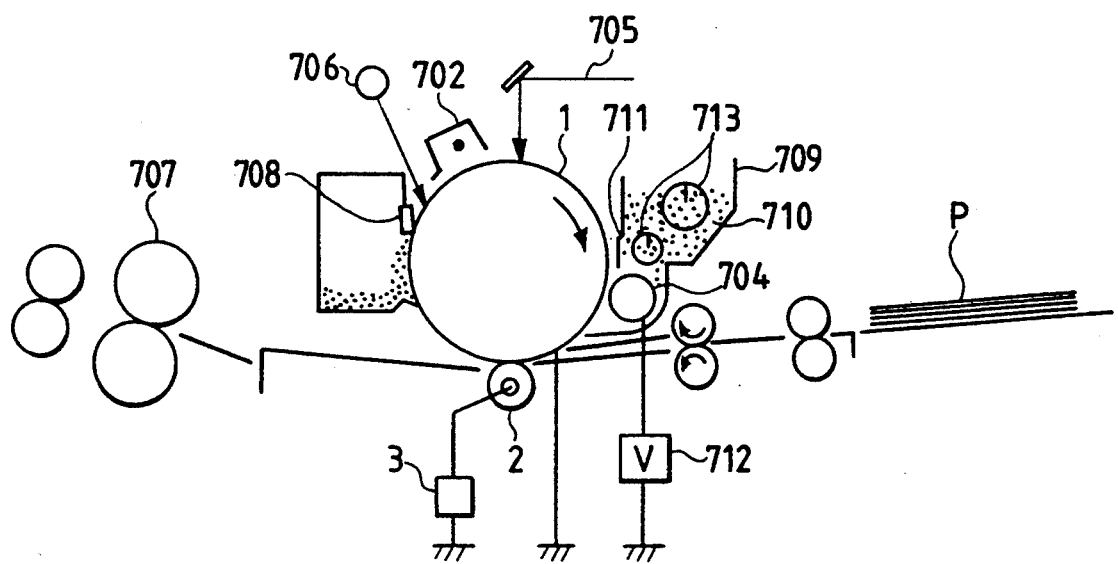
FIGS. 7 to 9 are schematic views which illustrate an image forming apparatus for embodying the image forming method according to the present invention.

The image forming method according to the present invention will be described below with reference to FIG. 7.

A primary charger 702 is used to negatively charge the surface of the photosensitive member, followed by forming a digital latent image by performing image scanning to effect an exposure 705 by using laser beams. Then, the latent image is inverse-developed by a one-component magnetic developer 710 in a developer container 709 provided with a developing sleeve 704 including a magnetic blade 711 and a magnet 714. A conductive base of a photosensitive drum 1 at the developing portion is grounded. To a developing sleeve 704 is applied an alternative bias, a pulse bias and/or DC bias by a bias application means 712. When transfer paper sheet P is conveyed to a transfer portion, charge is applied from the back side (the surface opposite to the photosensitive drum side) of the transfer paper sheet P by a voltage application means 8 so that an developed image (a toner image) on the surface of the photosensitive drum is transferred to the surface of the transfer paper sheet P by a contact transfer means 2. The transfer paper sheet P separated from the photosensitive drum 701 is subjected to a fixing process for the purpose of fixing the toner image formed on the transfer paper sheet P by a heating-and-pressurizing-roller fixing device 707.

The one-component developer left on the photosensitive drum after the transfer process has been performed is removed by a cleaning device 708 having a cleaning blade. The charge of the photosensitive drum 701 which has been cleaned up, is removed by erasing exposure 706, followed by repeating the process starting from the charging process by a primary charger 702.

An electrostatic image holder (the photosensitive drum) comprises a photosensitive layer and a conductive base, and is driven in a direction designated by an arrow. A non-magnetic and cylindrical developing sleeve 704 serving as a toner carrier rotates to move in the same direction as that of the movement of the surface of the electrostatic image holder. The non-magnetic and cylindrical sleeve 704 includes a multi-polar permanent magnet (magnet roll) serving as a magnetic-field generating means, the multi-polar permanent magnet being so disposed that it is not rotated. The one-component insulating and magnetic developer 710 in the developer container 709 is applied to the surface of the non-magnetic cylinder. The friction between the surface of the developing sleeve 704 and the magnetic toner particles supplies, for example, a negative triboelectric charge to the magnetic toner particles. By disposing the iron magnetic doctor blade 711 near by (an interval from 50 μm to 500 μm) the surface of the cylinder to face one magnetic pole site of the multi-polar permanent magnet, the thickness of the developer layer is reduced (30 μm to 300 μm) to a uniform thickness so that a developer layer having a thickness smaller than the interval between the electrostatic image holder 1 and the toner carrier 704 is formed in a non-contact manner in the developing portion. By adjusting the speed of rotation of the toner carrier 704, the speed of the movement of the surface of the sleeve is made to be the same or approximated to the speed of the electrostatic image holding surface. For the magnetic doctor blade 711, the opposing magnetic pole may be formed by using a permanent magnet in place of iron. An AC bias or a pulse bias may be applied at the developing portion to the toner carrier 704 by the bias means 712. It is necessary for the AC bias to have a frequency of 200 to 4000 Hz and Vpp of 500 to 3000 V.

At the time of the shift of the magnetic toner particles at the developing portion, the effects of the electrostatic force of the electrostatic image holding surface and the AC bias or the pulse bias cause the toner particles to shift to the electrostatic image portion.

For an alternative to the magnetic doctor blade 711, an elastic blade made of an elastic material such as silicon rubber may be used to press the developer layer so as to restrict the thickness of it, followed by applying the developer to the surface of the developer carrier.

Figure 8:
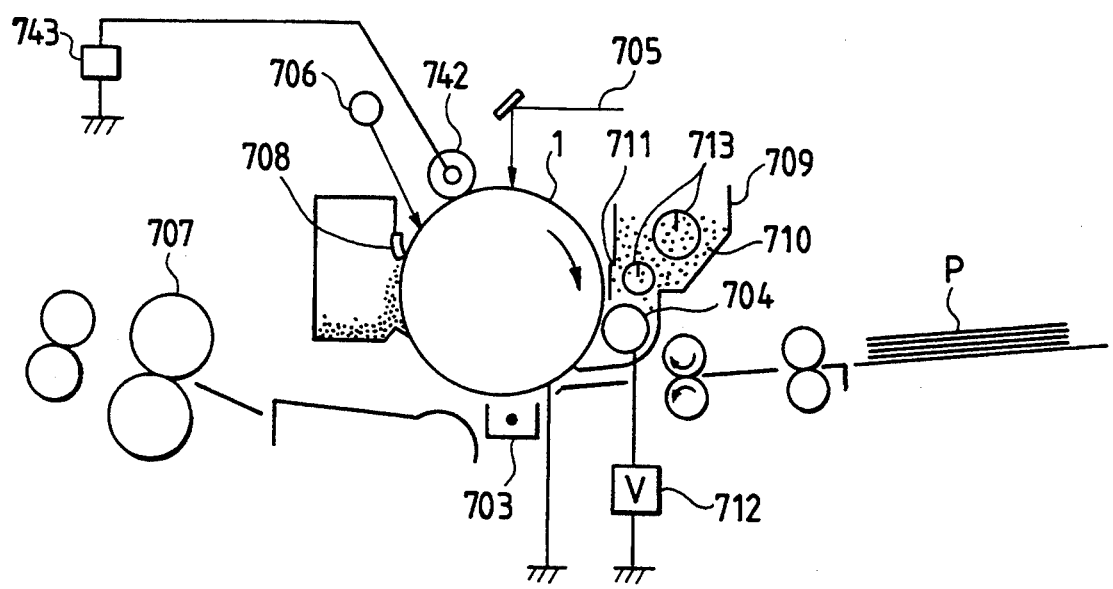

FIG. 8 illustrates an image forming apparatus comprising a contact charging means 742 to which voltage is applied from a bias application means 743, and a corona transference means 703.

Figure 9:
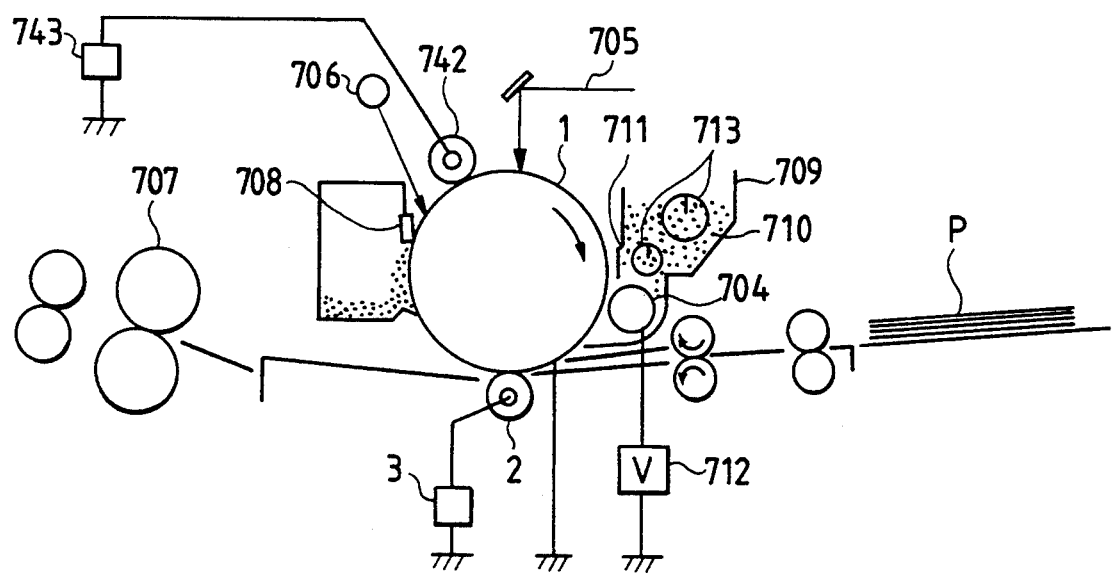

FIG. 9 illustrates an image forming apparatus comprising the contact charging means 742 and the contact transfer means 2.

The present invention will be specifically described below with reference to examples. However, the present invention is not limited thereto. In the descriptions hereinbelow, parts shows those by weight.

EXAMPLE 1

| | |
|---|---|
| styrene-butyl acrylate-divinylbenzene copolymer (copolymerization ratio 80/19.5/0.5, weight average molecular weight 320,000) | 100 parts |
| magnetic material (average particle size: about 0.2 μm) | 100 parts |
| low-molecular-weight polypropylene | 3 parts |
| chrome complex of monoazo dye | 4 parts |

The mixture of the above components was melted and kneaded by a twin screw kneading extruder heated to 140° C., and then the kneaded material was cooled and coarsely pulverized by a hammer mill. The material coarsely pulverized was finely-pulverized by a jet mill, followed by classifying and removing ultra-fine powder and coarse powder in the finely-pulverized material by a multi-division classifier. As a result, magnetic toner having a weight average particle size of 6.3 μm was obtained.

Then, 100 parts of silica fine powder (Aerosil #300, hydrophilic silica, manufactured by Nihon Aerosil) was treated with 20 parts of dimethyl dichlorosilane, followed by treating it with 10 parts of hexamethyl disilazane. The fine powder obtained had the hydrophobic ratio of 96.1%, the quantity of adhered carbon of 2.5 wt % and the BET specific surface area of 172 m$^2$/g. While stirring the fine powder thus obtained, 15 parts of dimethyl silicone oil (KF-96, 100 cs, manufactured by Shinetsu Chemistry) were applied by spraying. Then the fine powder was heated to 190° C. for 5 hours, so that the treated silica fine powder obtained had the hydrophobic ratio of 98.2%, the quantity of adhered carbon of 8.4 wt % and the BET specific surface area of 115 m$^2$/g. The change in the specific surface area after the silicone oil treatment had been completed was 67% and the quantity of adhered carbon was 5.9 wt %.

100 parts of the foregoing magnetic toner and one part of the foregoing treated silica fine powder were mixed by a Henschel mixer so that one-component magnetic developer was obtained.

The foregoing one-component developer was used to carry out copying by using a laser beam printer LBP-8II (manufactured by Canon and comprising an OPC photosensitive drum) which had been remodeled from 8 sheets/minutes to 16 sheets/minute and provided with a transfer apparatus as shown in FIG. 2.

The conditions for the transfer roller were determined as follows: the hardness of the surface rubber of the transfer roller was 27°, the transfer current was 1 μA, the transfer voltage was +2000 V, and the contact pressure was 50 g/cm. The conductive and elastic layer of the transfer roller was made of EPDM containing conductive carbon dispersed therein, the conductive and elastic layer having a volume resistance of 10$^8$ Ω·cm.

The primary charge was −700 V. A non-contact-gap between the photosensitive drum and the developer layer on the developing drum (including a magnet) was set, and copying of 8,000 sheets was carried out while applying an AC bias (f=1,800 Hz, Vpp=1,600 V) and DC bias (V$_{DC}$=−500 V) to the developing drum.

The toner images fixed by heated pressure roller were evaluated, resulting in excellent images having an image density of 1.4 or more while preventing occurrence of the transfer hollow with thick paper of 120 g/m$^2$ and a transparency film having a thickness of about 110 μm. Further, the number of damages of the surface of the OPC photosensitive drum was satisfactorily small.

In the case where copying 4,000 sheets of ordinary plain paper for a copying machine (75 g/m$^2$) was performed, a state of maintaining the image density was evaluated in the following manner. The results are shown in Table 1.

o (excellent): 1.35 or more
Δ (allowable): 1.0 to 1.34
x (defective): 1.0 or less

EXAMPLE 2

100 parts of silicia acid granules (Aerosil #300 manufactured by Nihon Aerosil) were treated with 30 parts of dimethyldichlorosilane, and then they were mixed with a solution prepared by diluting 15 parts of dimethyl silicone oil (KF-96, 100 cs, manufactured by Shinetsu Chemistry) with a solvent. The solvent was evaporated under lowered pressure, and then heating was carried out at the temperature of 180° C., thereby obtaining the treated silica fine powder having the hydrophobic ratio of 91.4%, the specific surface area of 120 m$^2$/g and the carbon content of 6.5 wt % (that is, quantity of carbon adhered due to the silicone oil treatment: 4.3 wt %).

By mixing 100 parts of the magnetic toner and treated silica fine powder prepared in the same manner in Example 1, three types of one-component magnetic developer were prepared.

Using the three types of one-component magnetic developer, copying of 4000 sheets was carried out in the same manner as in Example 1. The toner images fixed by the heated pressure roller were evaluated. The results are shown in Tables 1-1 and 1-2.

EXAMPLE 3

Copying was carried out in the same manner in Example 1 except for the use of a developer using 1.2 parts of treated silica fine powder prepared as follows: 100 parts of silica fine powder (Aerosil #200) was treated with 25 parts of dimethyldichlorosilane (hydrophobic ratio of 83.6%, the specific surface area of 172 m$^2$/g and the carbon content of 1.5 wt %). Then, it was mixed with a solution prepared by diluting 5 parts of dimethyl silicone oil (KF-96, 100 cs, manufactured by Shinetsu Chemistry) with a solvent. The solvent was evaporated under lowered pressure, and then heating was carried out at the temperature of 180° C., thereby obtaining the treated silica fine powder having the hydrophobic ratio of 84.8%, the specific surface area of 129 m$^2$/g and the carbon content of 4.6 wt % (quantity of carbon adhered due to the silicone oil treatment: 3.1 wt %).

As shown in Tables 1-2 and 1-2, excellent results were attained except for somewhat large number of damages on the surface of the OPC drum after multiple copying tests.

EXAMPLE 4

Copying was carried out in the same manner as in Example 1 except for the use of a developer using 0.8 parts of treated silica fine powder prepared as follows: 30 parts of silica fine powder (Aerosil #200 which was hydrophilic, having a specific surface area of 200 m$^2$/g) was mixed with a solution obtained by diluting 30 parts of dimethyl silicone oil (KF-96, 100 cs, manufactured by Shinetsu Chemistry) with a solvent. The solvent was evaporated under lowered pressure, and then heating was carried out at the temperature of 200° C. thereby obtaining the treated silica fine powder having the hydrophobic ratio of 87.2%, the specific surface area of 86 m$^2$/g and the carbon content of 7.9 wt % (quantity of carbon adhered due to the silicone oil treatment: 7.9 wt %). The results are shown in Table 1.

EXAMPLE 5

An experiment was conducted in the same manner as in Example 1 except for using the developer according to Example 2 and making the contact pressure, at which the transfer roller was brought into contact with the latent-image carrier, to be 5 g/cm. The results are shown in Tables 1-1 and 1-2.

COMPARATIVE EXAMPLE 1

An experiment was conducted in the same manner as in Example 1 except for using as treated silica fine powder, hydrophobic silica (quantity of carbon adhered due to the silicone oil treatment: 0 wt %) obtained by treating 100 parts of silica fine powder (Aerosil #300) with 30 parts of dimethyldichlorosilane and making the contact pressure, at which the transfer roller was brought into contact with the latent-image carrier, to be 2 g/cm. The durability of the density of the formed image was unsatisfactory, and the transfer hollow took place excessively. In addition, the deviation took place in the transferred image due to the want of the transfer pressure. Further, countless damages were formed on the surface of the drum after multiple copying tests, due to the difference in the lubrication properties of the treated surface of the silica.

TABLE 1-1

| | Pressure of contact of transfer roller (g/cm) | Additive (silica) | | |
|---|---|---|---|---|
| | | Specific surface area of the base (m$^2$/g) | Processing agent and its quantity (parts by weight) | Quality of carbon adhered after silicone oil or varnish treatment (wt %) |
| Example 1 | 50 | 300 | Dimethyldichlorosilane 20<br>Hexamethyldisilazane 10<br>Dimethylsilicone oil 15 | 8.4 |
| Example 2 | 50 | 300 | Dimethyldichlorosilane 30<br>Dimethylsilicone oil 15 | 4.3 |
| Example 3 | 50 | 200 | Dimethyldichlorosilane 25<br>Dimethylsilicone oil 5 | 3.1 |
| Example 4 | 50 | 200 | Dimethylsilicone oil 30 | 7.9 |
| Example 5 | 5 | 300 | Dimethyldichlorosilane 30<br>Dimethylsilicone oil 15 | 4.3 |
| Comparative Example 1 | 2 | 300 | Dimethyldichlorosilane 30 | 0 |

TABLE 1-2

| | Additive (silica) | Transfer hollow | | | |
|---|---|---|---|---|---|
| | Quantity of addition (parts/ 100 parts) | Density of image | Thick paper | Transparency film | State of surface of OPC drum |
| Example 1 | 1 | ○ | ⊙ | ⊙ | ⊙ |
| Example 2 | 0.8 | ○ | ○ | ○ | ○ |
| | 1.2 | ○ | ○ | ○ | ○ |
| | 1.5 | ○ | ○ | ○ | |
| Example 3 | 1.2 | ○ | ○ | ○ | |
| Example 4 | 0.8 | ○ | ○ | | |
| Example 5 | 0.8 | ○ | ○ | ○ | ○ |
| Comparative | 0.8 | X | △ | X | △ |

TABLE 1-2-continued

| | Additive (silica) Quantity of addition (parts/ 100 parts) | Density of image | Thick paper | Transparency film | State of surface of OPC drum |
|---|---|---|---|---|---|
| Example 1 | | | | | |

Evaluation:
⊙ ... excellent,
○ ... satisfactory,
△ ... allowable,
X ... defective

EXAMPLE 6

An experiment was performed in the same manner as in Example 1 except for the use of a developer using treated silica fine powder prepared as follows: 100 parts of silica fine powder (Aerosil #200) was treated with 20 parts of dimethyldichlorosilane (hydrophobic ratio of 82.6%, the specific surface area of 180 m$^2$/g and the carbon content of 1.1 wt %). Then, it was mixed with a solution prepared by diluting 15 parts of dimethyl silicone oil (KF-96, 100 cs, manufactured by Shinetsu Chemistry) with a solvent. The solvent was evaporated under lowered pressure, followed by heating at the temperature of 180° C., thereby obtaining the treated silica fine powder having the hydrophobic ratio of 90.8%, the specific surface area of 100 m$^2$/g and the carbon content of 5.2 wt % (quantity of carbon adhered due to the silicone oil treatment: 4.1 wt %). The results are shown in Tables 2-1 and 2-2.

EXAMPLE 7

An experiment was performed in the same way as in Example 1 except for the use of a developer using treated silica fine powder prepared as follows: 100 parts of silica fine powder (Aerosil #300) was treated with 30 parts of dimethyldichlorosilane (hydrophobic ratio of 82.3%, the specific surface area of 230 m$^2$/g and the carbon content of 2.2 wt %). Then, it was mixed with a solution prepared by diluting 20 parts of dimethyl silicone oil (KF-96, 100 cs, manufactured by Shinetsu Chemistry) with a solvent. The solvent was evaporated under lowered pressure, followed by heating at the temperature of 150° C., thereby obtaining the treated silica fine powder having the hydrophobic ratio of 95.4%, the specific surface area of 120 m$^2$/g (52% the specific surface area attained before the silicone oil treatment) and the carbon content of 8.5 wt %. The results obtained are shown in Tables 2-1 and 2-2.

EXAMPLE 8

An experiment was performed in the same way as in Example 1 except for the use of a developer using 1.2 parts of treated silica fine powder prepared as follows: 100 parts of silica fine powder (Aerosil #300) were treated with 35 parts of dimethyldichlorosilane (hydrophobic ratio of 85.8%, the specific surface area of 210 m$^2$/g and the carbon content of 2.6 wt %). Then, it was mixed with a solution prepared by diluting 5 parts of dimethyl silicone oil (KF-96, 100 cs, manufactured by Shinetsu Chemistry) with a solvent. The solvent was evaporated under lowered pressure, followed by heating at the temperature of 150° C., thereby obtaining the treated silica fine powder having the hydrophobic ratio of 83.6%, the specific surface area of 125 m$^2$/g (59% time the specific surface area attained before the silicone oil treatment) and the carbon content of 7.1 wt %.

Excellent results were attained as shown in Table 2 although somewhat large number of damages were observed on the surface of the OPC drum after multiple copying tests.

EXAMPLE 9

An experiment was performed in the same way as in Example 1 except for the use of a developer-using treated silica fine powder prepared as follows: silica fine powder (Aerosil #200 which was hydrophilic, having a specific surface area of 200 m$^2$/g) were mixed with a solution obtained by diluting 35 parts of dimethyl silicone oil (KF-96, 100 cs, manufactured by Shinetsu Chemistry) with a solvent. The solvent was evaporated under lowered pressure, followed by heating at the temperature of 150° C., thereby obtaining the treated silica fine powder having the hydrophobic ratio of 89.2%, the specific surface area of 80 m$^2$/g (40% time the specific surface area attained before the silicone oil treatment) and the carbon content of 8.0 wt %. The results obtained are shown in Tables 2-1 and 2-2.

EXAMPLE 10

An experiment was conducted in the same way as in Example 1 except for making the contact pressure, at which the transfer roller was brought into contact with the latent-image carrier, to be 5 g/cm.

Comparative Example 2

An experiment was conducted in the same way as in Example 6 except for using treated silica fine powder prepared by treating 100 parts of silica fine powder (Aerosil #200) with 20 parts of dimethyldichlorosilane and making the contact pressure, at which the transfer roller was brought into contact with the latent-image carrier, to be 2 g/cm. The durability of the density of the formed image was unsatisfactory, and the transfer hollow took place excessively.

In addition, the deviation took place in the transferred image due to the want of the transfer pressure. Further, countless damages were formed on the surface of the drum after multiple copying tests due to the difference in the lubrication properties of the treated surface of the silica.

TABLE 2-1

| | Pressure of contact of transfer roller (g/cm) | Specific surface area of the base (m²/g) | Processing agent and its quantity (parts by weight) | | Ratio of specific surface area before and after silicone oil or varnish treatment (wt %) |
|---|---|---|---|---|---|
| Example 6 | 50 | 200 | Dimethyldichlorosilane | 20 | 0.56 |
| | | | Dimethylsilicone oil | 15 | |
| Example 7 | 50 | 300 | Dimethyldichlorosilane | 30 | 0.43 |
| | | | Dimethylsilicone oil | 20 | |
| Example 8 | 50 | 300 | Dimethyldichlorosilane | 35 | 0.59 |
| | | | Dimethylsilicone oil | 5 | |
| Example 9 | 50 | 200 | Dimethylsilicone oil | 35 | 0.40 |
| Example 10 | 5 | 200 | Dimethyldichlorosilane | 20 | 0.56 |
| | | | Dimethylsilicone oil | 15 | |
| Comparative Example 2 | 2 | 200 | Dimethyldichlorosilane | 20 | — |

TABLE 2-2

| | Additive (silica) Quantity of addition (parts/ 100 parts) | Transfer hollow Density of image | Thick paper | Transparency film | State of surface of OPC drum |
|---|---|---|---|---|---|
| Example 6 | 0.8 | ○ | ○ | ○ | ○ |
| | 1.2 | ○ | ○ | ○ | ○ |
| | 1.5 | ○ | ○ | ○ | △ |
| Example 7 | 0.8 | ○ | ○ | ○ | ○ |
| Example 8 | 1.2 | ○ | ○ | ○ | △ |
| Example 9 | 0.8 | 66 | ○ | ○ | △ |
| Example 10 | 0.8 | ○ | ○ | ○ | ○ |
| Comparative Example 2 | 0.8 | X | △ | X | △ |

EXAMPLE 11

A copying experiment was performed by admitting the developer according to Example 1 into a laser beam printer LBP-8II (manufactured by Canon) which had been remodeled from 8 sheets/minutes to 16 sheets/minute. Copying of 15,000 image sheets was carried out under room temperature and room humidity (23° C. and 60% RH), resulting in a stable density of the image of 1.4 to 1.5 and in excellent image quality. Further, the quantity of the toner recovered by the cleaning operation was very small.

A similar copying experiment was carried out on 10,000 sheets after they had been allowed to stand under high temperature and high humidity conditions (32.5° C. and 90% RH), resulting in an image density of 1.4 or more. Further, copying of a transparency film can be performed satisfactorily while preventing the transfer hollow from occurring.

EXAMPLE 12

100 parts of silica fine powder (Aerosil #200, hydrophilic silica, manufactured by Nihon Aerosil) was treated with 10 parts of dimethyl dichlorosilane, followed by processing it with 15 parts of hexamethyl disilazane. As a result, fine powder was obtained, the hydrophobic ratio of which was 98.2%, the quantity of carbon adhered to which was 2.1 wt % and the BET specific surface area of which was 155 m²/g. While stirring the fine powder thus obtained, 12 parts of dimethyl silicone oil (KF-96, 100 cs) was applied by spraying. Then, the fine powder was heated at 180° C. for 7 hours to give the treated silica fine powder which has the hydrophobic ratio of 96.7%, the quantity of adhered carbon of 8.4 wt % and the BET specific surface area of 113 m²/g. The change in the specific surface area after the silicone oil treatment had been completed was 73% and the quantity of adhered carbon was 6.3 wt %.

100 parts of the magnetic toner used in Example 1 and 1.2 parts of the treated silica fine powder were mixed by a Henschel mixer to give one-component magnetic developer. The one-component developer was used to carry out copying in the same way as in Example 11. The result obtained was excellent similarly to Example 1.

EXAMPLE 13

100 parts of silica fine powder (Aerosil #300) was treated with 20 parts of methyltrichlorosilane, followed by processing it with 5 parts of hexamethyldisilanzane, so that fine powder was obtained, the hydrophobic ratio of which was 88.6%, the quantity of carbon adhered to which was 1.8 wt % and the BET specific surface area of which was 226 m²/g. Then, the fine powder was mixed with a solution prepared by 18 parts of dimethyl silicone oil (KF-96, 100 cs) with a solvent. The solvent was evaporated under lowered pressure, followed by heating at the temperature of 190° C. for 10 hours, to give the treated silica fine powder which has the hydrophobic ratio of 93.4%, the quantity of adhered carbon of 8.9 wt % and the BET specific surface area of 127 m²/g. The change in the specific surface area caused by performing the silicone oil process was 56% time and the quantity of adhered carbon was 7.1 wt %.

Copying was carried out in the same way as in Example 11 by using a one-component developer prepared in the same way as in Example 1 except for using the foregoing treated silica fine powder. The result obtained was excellent similarly to Example 1.

EXAMPLE 14

100 parts of silica fine powder (Aerosil #300 manufactured by Nihon Aerosil) was treated with 30 parts of dimethyldichlorosilane (the hydrophobic ratio of 82.3%, the specific surface area of 230 m$^2$/g and the carbon content of 2.2 wt %). The resulting silica fine powder was mixed with a solution prepared by diluting 15 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the hydrophobic ratio of 91.4%, the specific surface area of 120 m$^2$/g and the carbon content of 6.5 wt % (that is, quantity of carbon adhered due to the silicone oil treatment: 4.3 wt %).

100 parts of the magnetic toner according to Example 1 and 0.8 part of silica fine powder treated with dimethyl silicone oil after treated with dimethyldichlorosilane were mixed by a Henschel mixer to give a one-component magnetic developer.

By using the foregoing developer, copying of 8,000 image sheets was carried out under room temperature and room humidity and high temperature and high humidity in the same way as in Example 11. An excellent result similar to Example 11 was obtained.

Comparative Example 3

An experiment was carried out in the same way as in Example 14 except for using treated silica fine powder prepared by processing 100 parts of silica fine powder (Aerosil #300) with 300 parts of dimethyldichlorosilane.

Although an excellent image exhibiting an image density of 1.3 was formed under room temperature and room humidity, the image density was lowered to 1.0 with the developer of this Comparative Example which has been allowed to stand at high temperature and high humidity for one day.

EXAMPLE 15

An experiments was performed in the same way as in Example 14 except for using treated silica fine powder prepared as follows: 100 parts of silica fine powder (Aerosil #200) was treated with 20 parts of dimethyldichlorosilane (the hydrophobic ratio of 82.6%, the specific surface area of 180 m$^2$/g and the carbon content of 1.1 wt %). Then, it was mixed with a solution prepared by diluting 15 parts of dimethyl silicone oil (KF-96, 100 cs, manufactured by Shinetsu Chemistry) with a solvent. The solvent was evaporated under lowered pressure, followed by heating at the temperature of 180° C., to give the treated fine powder which has the hydrophobic ratio of 90.8%, the specific surface area of 100 m$^2$/g and the carbon content of 5.2 wt % (quantity of carbon adhered due to the silicone oil treatment: 4.1 wt %).

Even when the developer of this Example was allowed to stand in a high temperature and high humidity environment, an excellent image exhibiting an image density of 1.4 or more was obtained. Further, copying of a transparency film could also be performed satisfactorily. Excellent images were obtained in various environmental conditions. In addition, the quantity of the recovered residual toner the photosensitive member was very small.

EXAMPLE 16

An experiments was performed in the same way as in Example 14 by using the treated silica fine powder (the hydrophobic ratio of 95.1%, the specific surface area of 91 m$^2$/g and the carbon content of 7.3 wt % (quantity of carbon adhered due to the silicone oil treatment: 6.2 wt %) obtained in the same way as in Example 5 except for making the quantity of dimethyl silicone oil (KF-96, 100 cs, manufactured by Shinetsu Chemistry) to be 20 parts.

Excellent images similar to Example 15 were obtained under various enviroments.

EXAMPLE 17

An experiment was performed in the same way as in Example 14 except for using treated silica fine powder prepared as follows: 100 parts of silica fine powder (Aerosil #200) was treated with 25 parts of dimethyldichlorosilane (the hydrophobic ratio of 83.6%, the specific surface area of 172 m$^2$/g and the carbon content of 1.5 wt %). Then, it was mixed with a solution prepared by diluting 5 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the hydrophobic ratio of 84.8%, the specific surface area of 129 m$^2$/g and the carbon content of 4.6 wt % (quantity of carbon adhered due to the silicone oil treatment: 3.1 wt %).

Even when the developer of this Example was allowed to stand in a high temperature and high humidity environment, an excellent image exhibiting an image density of 1.3 or more was obtained. Further, copying of a transparency film could be performed satisfactorily. Excellent images were obtained in various environmental conditions. In addition, the quantity of the recovered residual toner from the photosensitive member was very small.

EXAMPLE 18

An experiment was performed in the same way as in Example 14 except for using treated silica fine powder prepared as follows: 100 parts of silica fine powder (Aerosil #300 was treated with 30 parts of trimethyldichlorosilane (the hydrophobic ratio of 92.2%, the specific surface area of 213 m$^2$/g and the carbon content of 3.5 wt %). Then, it was mixed with a solution prepared by diluting 10 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the hydrophobic ratio of 96.3%, the specific surface area of 147 m$^2$/g and the carbon content of 7.1 wt % (quantity of carbon adhered due to the silicone oil treatment: 3.6 wt %).

Even when the developer of this Example was allowed to stand in a high temperature and high humidity environment, an excellent image exhibiting an image density of 1.4 or more was obtained. Further, copying of a transparency film could be performed satisfactorily. Excellent images were obtained in various environmental conditions. In addition, the quantity of the recovered residual toner from the photosensitive member was very small.

EXAMPLE 19

An experiment was performed in the same way as in Example 14 except for using treated silica fine powder prepared as follows: silica fine powder (Aerosil #200 which is hydrophilic, having a specific surface area of 200 m$^2$/g) was mixed with a solution prepared by diluting 30 parts of dimethyl silicone oil (KF-96, 100 cs, manufactured by Shinetsu Chemistry) with a solvent. The solvent was evaporated under lowered pressure, followed by heating at the temperature of 200° C., to give the treated silica fine powder which has the hydrophobic ratio of 87%, the specific surface area of 86 m$^2$/g and the carbon content of 7.9 wt % (quantity of carbon adhered due to the silicone oil treatment: 7.9 wt %).

Although a somewhat unsatisfactory image density of 1.2 was attained in a low temperature and low humidity environment, an excellent image exhibiting an image density of 1.3 or more was obtained even when the developer of this Example was allowed to stand in a high temperature and high humidity environment. Further, copying to a transparency film was performed satisfactorily.

EXAMPLE 20

An experiment was performed in the same way as in Example 14 except for using treated silica fine powder prepared as follows: 100 parts of silica fine powder (Aerosil #300) was treated with 30 parts of dimethyldichlorosilane (the hydrophobic ratio of 77.3%, the specific surface area of 230 m$^2$/g and the carbon content of 2.2 wt %). Then, it was mixed with a solution prepared by diluting 15 parts of α-methyl styrene-denatured silicone oil (KF-410 manufactured by Shinetsu Chemistry) with a solvent. The solvent was evaporated under lowered pressure, followed by heating at the temperature of 150° C., to give the treated silica powder which has the hydrophobic ratio of 86.8%, the specific surface area of 143 m$^2$/g and the carbon content of 6.1 wt % (quantity of carbon adhered due to the silicone oil treatment: 3.9 wt %). Even when the developer of this Example was allowed to stand in a high temperature and high humidity environment, an excellent image exhibiting an image density of 1.3 or more was obtained. Further, copying of a transparency film could be performes satisfactorily. Excellent images were obtained in various environmental conditions. In addition, the quantity of the recovered residual toner from the photosensitive member was very small.

EXAMPLE 21

An experiment was performed in the same way as in Example 11 except for using treated silica fine powder prepared as follows: 100 parts of silica fine powder (Aerosil #200) was treated with 20 parts of trimethylchlorosilane (the hydrophobic ratio of 84.1%, the specific surface area of 160 m$^2$/g and the carbon content of 2.5 wt %). The resulting silica fine powder was subjected to a process in which 15 parts of dimethyl silicone oil (KF-96, 100 cs, manufactured by Shinetsu Chemistry) was diluted with a solvent to be sprayed, followed by drying. Then, heating was carried out at the temperature 150° C. to give the treated silica fine powder which has the hydrophobic ratio of 92%, the specific surface area of 95 m$^2$/g and the carbon content of 7.5 wt % (quantity of carbon adhered due to the silicone oil treatment: 5.0 wt %).

Even when the developer of this Example was allowed to stand in a high temperature and high humidity environment, an excellent image exhibiting an image density of 1.3 or more was obtained. Further, copying of a transparency film could be performed satisfactorily. Excellent images were obtained in various environmental conditions. In addition, the quantity of the recovered residual toner from the photosensitive member was very small.

COMPARATIVE EXAMPLE 4

An experiment was performed in the same way as in Example 19 except for using treated silica fine powder prepared by treating 100 parts of silica fine powder (Aerosil #200) with 20 parts of dimethyldichlorosilane.

Although an excellent image exhibiting an image density of 1.3 was obtained in a room temperature and room humidity environment, the image density was lowered to 1.0 with the developer of this Comparative Example which had been allowed to stand in a high temperature and high humidity environment for one day.

EXAMPLE 22

An experiment was performed in the same way as in Example 14 except for using treated silica fine powder prepared as follows: 100 parts of silica fine powder (Aerosil #300) was treated with 30 parts of dimethyldichlorosilane (the hydrophobic ratio of 82.3%, the specific surface area of 230 m$^2$/g and the carbon content of 2.2 wt %). Then, it was mixed with a solution prepared by diluting 20 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the hydrophobic ratio of 95.4%, the specific surface area of 120 m$^2$/g (52% the specific surface area attained before the silicone oil treatment) and the carbon content of 8.5 wt %.

Even when the developer of this Example was allowed to stand in a high temperature and high humidity enviornment, an excellent image exhibiting an image density of 1.4 or more was obtained. Further, copying of a transparency film was performed satisfactorily. Excellent images were obtained in various environmental conditions. In addition, the quantity of the recovered residual toner from the photosensitive member was very small.

EXAMPLE 23

An experiment was performed in the same way as in Example 14 except for using treated silica fine powder prepared as follows: 100 parts of silica fine powder (Aerosil #300) was treated with 35 parts of dimethyldichlorosilane (hydrophobic ratio of 85.8%, the specific surface area of 210 m$^2$/g and the carbon content of 2.6 wt %). Then, it was mixed with a solution prepared by diluting 5 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the hydrophobic ratio of 83.6%, the specific surface area of 125 m$^2$/g (59% the specific surface area attained before the silicone oil treatment) and the carbon content of 7.1 wt %.

Even when the developer of this Example was allowed to stand in a high temperature and high humidity environment, an excellent image exhibiting an image density of 1.3 or more was obtained. Further, copying of a transparency film could be performed satisfactorily. Excellent images were obtained in various environmental conditions. In addition, the quantity of the recovered residual toner from the photosensitive member was very small.

EXAMPLE 24

An experiment was performed in the same way as in Example 14 except for using treated silica fine powder prepared as follows: 100 parts of silica fine powder (Aerosil #200) was treated with 20 parts of trimethylchlorosilane (hydrophobic ratio of 84.1%, the specific surface area of 160 $m^2/g$ and the carbon content of 2.5 wt %). Then, it was mixed with a solution prepared by diluting 10 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the hydrophobic ratio of 88.6%, the specific surface area of 90 $m^2/g$ (56% for specific surface area attained before the silicone oil treatment) and the carbon content of 7.0 wt %.

Even when the developer of this Example was allowed to stand in a high temperature and high humidity environment, an excellent image exhibiting an image density of 1.4 or more was obtained. Further, copying of a transparency film could be performed satisfactorily. Excellent images were obtained in various environmental conditions. In addition, the quantity of the recovered residual toner from the photosensitive member was very small.

EXAMPLE 25

An experiment was performed in the same way as in Example 14 except for using treated silica fine powder prepared as follows: silica fine powder (Aerosil #200 which was hydrophilic, having a specific surface area of 200 $m^2/g$) were mixed with a solution prepared by diluting 35 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the hydrophobic ratio of 89.2%, the specific surface area of 80 $m^2/g$ (40% the specific surface area attained before the silicone oil treatment) and the carbon content of 8.0 wt %.

Although a somewhat unsatisfactory image density of 1.2 was attained in a low temperature and low humidity environment, an excellent image exhibiting an image density of 1.3 or more was obtained even when the developer of this Example was allowed to stand in a high temperature and high humidity environment. Further, copying of a transparency film could be performed satisfactorily.

EXAMPLE 26

An experiment was performed in the same way as in Example 14 except for using treated silica fine powder prepared as follows: 100 parts of silica fine powder (Aerosil #200) was treated with 20 parts of trimethylchlorosilane (the hydrophobic ratio of 84.1%, the specific surface area of 160 $m^2/g$ and the carbon content of 7.4 wt %). Then, it was mixed with a solution prepared by diluting 15 parts of α-methyl styrene-denatured silicone oil (KF-410, manufactured by Shinetsu Chemistry) with a solvent. The solvent was evaporated under lowered pressure, followed by heating at the temperature of 150° C., to give the treated silica fine powder which has the specific surface area of 80 $m^2/g$ (50% the specific surface area attained before the silicone oil treatment).

Even when the developer of this Example was allowed to stand in a high temperature and high humidity environment, an excellent image exhibiting an image density of 1.4 or more was obtained. Further, copying of a transparency film was performed satisfactorily. Excellent images were obtained in various environmental conditions. In addition, the quantity of the recovered residual toner from the photosensitive member was very small.

EXAMPLE 27

Using the magnetic developer according to Example 12 in an image forming apparatus (remodeled laser beam printer LBP-8II manufactured by Canon) having the contact charging device as shown in FIG. 4 while applying DC voltage and AC voltage (500 Hz and 2,000 Vpp), Toner image-forming tests were carried out in which toner images were successively formed in an reversal development mode at a printing speed of 16 (A4) sheets/minute. The toner image-forming test was carried out on 8,000 sheets under each of the room temperature and room humidity (25° C. and 60% RH) conditions, the high temperature and high humidity conditions (32.5° C. and 85% RH) and the low temperature and low humidity conditions (15° C. and 10% RH). The printed-out images of 8,000 sheets were evaluated. In these test, the states of the surfaces of the (roller type) charging member and the photosensitive drum were also observed.

The charging roller 2 had a diameter of 12 mm, the core had a diameter of 5 mm, the conductive rubber layer 2b had a thickness of about 3.5 mm and the separation-type coating made of methoxymethylated nylon had a thickness of 20 μm, the charging roller 2 being brought into contact with the OPC photosensitive drum at a total pressure of 1.2 Kg (line pressure of 55 g/cm).

Excellent results exhibiting an image density of 1.35 or more were obtained in any of the foregoing environments. Even after the toner image-forming test was carried out on 12,000 sheets, no adhesion of melted toner to the photosensitive member or the charging member was observed.

EXAMPLE 28

A magnetic developer was obtained by mixing 100 part s of the magnetic toner according to Example 1 with 1.0 part of the treated silica fine powder used in Example 14 which was treated with dimethyl silicone oil after having been treated with dimethyldichlorosilane, by using a Henschel mixer.

The magnetic developer thus obtained was admitted into the image forming apparatus used in Example 27, and Tests similar to Example 27 were carried out on 6,000 sheets under various envionments to evaluate the image quality. Then, the tests were continued up to 10,000 sheets to observe the surfaces of the charging member and the photosensitive drum.

Results are shown in Table 3.

The evaluation criteria are as follows:
Level of adhesion of melted toner to the charging member and the photosensitive drum:
  ○. . . No adhesion
  ○Δ. . . 1 to 3 adhesion points in a solid black A4 sheet
  Δ. . . 4 to 10 adhesion points in a solid black A4 sheet
  x . . . 11 or more adhesion points in a solid black A4 sheet

EXAMPLE 29

A magnetic developer was obtained in the same way as in Example 28 except for using treated silica fine powder prepared as follows: 100 parts of silica fine powder (Aerosil #200) used in Example 15 was treated with 20 parts of dimethyldichlorosilane (carbon content of 1.1 wt %). Then, it were mixed with a solution prepared by diluting 15 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the carbon content of 5.2 wt % (quantity of adhered carbon due to the silicone oil treatment: 4.1 wt %).

The obtained magnetic developer was evaluated in the same way as in Example 28. The evaluation results of are shown in Table 3.

EXAMPLE 30

A magnetic developer was obtained in the same way as in Example 28 except for using the treated silica fine powder used in Example 16.

The obtained magnetic developer was evaluated in the same way as in Example 28. The evaluation results are shown in Table 3.

EXAMPLE 31

A magnetic developer was obtained in the same way as in Example 28 except for using treated silica fine powder prepared as follows: 100 parts of silica fine powder (Aerosil #200) used in Example 17 was treated with 25 parts of dimethyldichlorosilane (carbon content of 1.5 wt %). Then, it was mixed with a solution prepared by diluting 5 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the carbon content of 4.6 wt % (quantity of adhered carbon due to the silicone oil treatment: 3.1 wt %).

The obtained magnetic developer was evaluated in the same way as in Example 28. The evaluation results are shown in Table 3.

EXAMPLE 32

A magnetic developer was obtained in the same way as in Example 28 except for using treated silica fine powder prepared as follows: 100 parts of silica fine powder (Aerosil #300) used in Example 18 was treated with 30 parts of trimethylchlorosilane (carbon content of 3.5 wt %). Then, it was mixed with a solution prepared by diluting 10 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the carbon content of 7.1 wt % (quantity of adhered carbon due to the silicone oil treatment: 3.6 wt %).

The obtained magnetic developer was evaluated in the same way as in Example 28. The evaluation results are shown in Table 3.

EXAMPLE 33

A magnetic developer was obtained in the same way as in Example 28 except for using treated silica fine powder prepared as follows: silica fine powder (Aerosil #200) used in Example 19 was mixed with a solution prepared by diluting 30 parts of dimethyl silicone oil (KF-96, 100 cs, manufactured by Shinetsu Chemistry) with a solvent. The solvent was evaporated under lowered pressure, followed by heating at the temperature of 200° C., to give the treated silica fine powder which has the carbon content of 7.9 wt % (quantity of adhered carbon due to the silicone oil treatment: 7.9 wt %).

The obtained magnetic developer was evaluated in the same way as in Example 28. The evaluation results are shown in Table 3.

EXAMPLE 34

A magnetic developer was obtained in the same way as in Example 28 except for using treated silica fine powder prepared as follows: 100 parts of silica fine powder (Aerosil #300) used in Example 20 was treated with 30 parts of dimethyldichlorosilane (carbon content of 2.2 wt %). Then, it was mixed with a solution prepared by diluting 15 parts of $\alpha$-methyl silicone oil (KF-410, manufactured by Shinetsu Chemistry) with a solvent. The solvent was evaporated under lowered pressure, followed by heating at the temperature of 150° C., to give the treated silica fine powder which has the carbon content of 6.1 wt % (quantity of adhered carbon due to the silicone oil treatment: 3.9 wt %).

The obtained magnetic developer was evaluated in the same way as in Example 28 using the image forming apparatus (laser beam printer LBP-8II manufactured by Canon) having the contact charging device shown in FIG. 5. The evaluation results are shown in Table 3.

EXAMPLE 35

An experiment was performed in the same way as in Example 28 except for using treated silica fine powder prepared as follows: 100 parts of silica fine powder (Aerosil #200) used in Example 21 was treated with 20 parts of trimethylchlorosilane (carbon content of 2.5 wt %). The resulting silica fine powder was subjected to a process in which 15 parts of dimethyl silicone oil (KF-96, 100 cs, manufactured by Shinetsu Chemistry) was diluted with a solvent to be sprayed, followed by drying. Then, heating was carried out at the temperature of 150° C. to give the treated silica fine powder which has the carbon content of 7.5 wt % (quantity of carbon adhered due to the silicone oil treatment: 5.0 wt %).

The results obtained in the above experiment are shown in Table 3.

COMPARATIVE EXAMPLE 5

A magnetic developer was obtained in the same way as in Example 28 except for using non-treated silica fine powder (Aerosil #300) as the fine powder.

The obtained magnetic developer was evaluated in the same way as in Example 28. The evaluation results are shown in Table 3.

COMPARATIVE EXAMPLE 6

A magnetic developer was obtained in the same way as in Example 28 except for using the treated silica fine powder prepared by treating 100 parts of silica fine powder (Aerosil #300) used in Comparative Example 1 with 30 parts of dimethyldichlorosilane.

The obtained magnetic developer was evaluated in the same way as in Example 28. The results of evaluations are shown in Table 3.

TABLE 3

| | Added silica fine powder | Quantity of adhered carbon due to silicone oil treatment [wt %] | Evaluation result | |
|---|---|---|---|---|
| | | | Image density three environments | Adhesion of toner to charging roller and photosensitive member After 10000 sheets copying in high temperature and high humidity environment |
| Example 28 | Treatment by using dimethyldichlorosilane, and then treatment by using dimethyl silicone oil | 4.3 | 1.35 to 1.50 | ○ |
| Example 29 | Treatment by using dimethyldichlorosilane, and then treatment by using dimethyl silicone oil | 4.1 | 1.35 to 1.50 | ○ |
| Example 30 | Treatment by using dimethyldichlorosilane, and then treatment by using dimetyl silicone oil | 6.2 | 1.35 to 1.45 | ○ |
| Example 31 | Treatment by using dimethyldichlorosilane, and then treatment by using dimethyl silicone oil | 3.1 | 1.25 to 1.45 | ○△ |
| Example 32 | Treatment by using trimethylchlorosilane, and then treatment by using dimethyl silicone oil | 3.6 | 1.30 to 1.45 | ○ |
| Example 33 | Treatment by using dimethyl silicone oil | 7.9 | 1.15 to 1.35 | △ |
| Example 34 | Treatment by using dimethyldichlorosilane, and then treatment by using α-methyl styrene denatured silicone oil | 3.9 | 1.25 to 1.45 | ○ |
| Example 35 | Treatment by using trimethylchlorosilane, and then treatment by using dimethyl silicone oil | 5.0 | 1.30 to 1.40 | ○ |
| Comparative Example 5 | No treatment | No treatment | 1.00 to 1.20 | X |
| Comparative Example 6 | Treatment by using dimethyldichlorosilane | No treatment | 1.15 to 1.30 | X |

EXAMPLE 36

A magnetic developer was obtained in the same way as in Example 28 by using the treated silica fine powder used in Example 22.

The magnetic developer was evaluated in the same way as in Example 28. The evaluation results are shown in Table 4.

EXAMPLE 37

A magnetic developer was obtained in the same way as in Example 28 except for using treated silica fine powder prepared as follows: 100 parts of silica fine powder (Aerosil #300) used in Example 23 was treated with 35 parts of dimethyldichlorosilane (specific surface area of 210 m$^2$/g). The resulting silica fine powder was mixed with a solution prepared by diluting 5 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the specific surface area of 125 m$^2$/g (59% the specific surface area attained before the silicone oil treatment).

The magnetic developer was evaluated in the same way as in Example 28. The evaluation results are shown in Table 4.

EXAMPLE 38

A magnetic developer was obtained in the same way as in Example 28 except for using treated silica fine powder prepared as follows: 100 parts of silica fine powder (Aerosil #200) used in Example 14 was treated with 20 parts of trimethylchlorosilane (specific surface area of 160 m$^2$/g). The resulting silica fine powder was mixed with a solution prepared by diluting 10 parts of dimethyl silicone oil (KF-96, 100 cs, manufactured by Shinetsu Chemistry) with a solvent. The solvent was evaporated under lowered pressure, followed by heating at the temperature of 180° C., to give the treated silica fine powder which has the specific surface area of 90 m$^2$/g (56% the specific surface area attained before the silicone oil treatment).

The magnetic developer was evaluated in the same way as in Example 28. The evaluation results are shown in Table 4.

EXAMPLE 39

A magnetic developer was obtained in the same way as in Example 28 except for using treated silica fine powder prepared as follows: silica fine powder (Aerosil #200 having a specific surface area of 200 m$^2$/g) used in Example 15 was mixed with a solution prepared by diluting 35 parts of dimethyl silicone oil (KF-96, 100 cs, manufactured by Shinetsu Chemistry) with a solvent. The solvent was evaporated under lowered pressure, followed by heating at the temperature of 150° C., to give the treated silica fine powder which has the specific surface area of 80 m$^2$/g (40% the specific surface area attained before the silicone oil treatment).

The magnetic developer was evaluated in the same way as in Example 28. The evaluation results are shown in Table 4.

EXAMPLE 40

A magnetic developer was obtained in the same way as in Example 28 except for using treated silica fine powder prepared as follows: 100 parts of silica fine powder (Aerosil #200) used Example 26 was treated with 20 parts of trimethylchlorosilane (specific surface area of 160 $m^2/g$). The resulting silica fine powder was mixed with a solution prepared by diluting 15 parts of $\alpha$-methylstyrene denatured silicone oil (KF-410 manufactured by Shinetsu Chemistry) with a solvent. The solvent was evaporated under lowered pressure, followed by heating at the temperature of 150° C., to give the treated silica fine powder which has the specific surface area of 80 $m^2/g$ (50% the specific surface area attained before the silicone oil treatment).

The magnetic developer thus obtained was used in the image forming apparatus having the contact charging device shown in FIG. 5 (remodeled laser beam printer LBP-8II manufactured by Canon) to be evaluated in the same way as in Example 28. The evaluation results are shown in Table 4.

COMPARATIVE EXAMPLE 7

A magnetic developer was obtained in the same way as in Example 28 except for using non-treated silica fine powder (Aerosil #200) as fine powder to be evaluated similarly to Example 28. The evaluation results are shown in Table 4.

COMPARATIVE EXAMPLE 8

A magnetic developer was obtained in the same way as in Example 28 except for using treated silica fine powder (Aerosil #200) used in Comparative Example 2 as treated silica fine powder to be evaluated similarly to Example 28. The evaluation results are shown in Table 4.

TABLE 4

| | Added silica fine powder | | | | Evaluation results | |
|---|---|---|---|---|---|---|
| | | BET (A) prior to silicone oil treatment ($m^2/g$) | BET (B) after silicone oil treatment ($m^2/g$) | BET ratio before and after treatment (B)/(A) | Image density in three environments | Adhesion of melted toner to photosensitive member and charging roller in high temperature and high humidity environment |
| Example 36 | After dimethyldichlorosilane treatment, dimethylsilicone oil treatment | 230 | 100 | 0.43 | 1.30 to 1.45 | ○ |
| Example 37 | After dimethyldichlorosilane treatment, dimethylsilicone oil treatment | 210 | 125 | 0.59 | 1.25 to 1.40 | ○Δ |
| Example 38 | After trimethylchlorosilane treatment, dimethylsilicone oil treatment | 160 | 90 | 0.56 | 1.35 to 1.50 | ○ |
| Example 39 | Dimethyl silicone oil treatment | 200 | 80 | 0.40 | 1.20 to 1.35 | Δ |
| Example 40 | After trimethylchlorosilane treatment, $\alpha$-methylstyrene denatured silicone oil | 160 | 80 | 0.50 | 1.30 to 1.45 | ○ |
| Comparative Example 7 | No treatment | 200 | No treatment | — | 1.05 to 1.20 | X |
| Comparative Example 8 | Dimethyldichlorosilane treatment | 180 | No treatment | — | 1.20 to 1.35 | X |

EXAMPLE 41

The developer according to Example 1 was used in the image forming apparatus shown in FIG. 9 to form an image, resulting in an excellent result.

According to the present invention, a developer is provided which exhibits a high density and which enables a high quality image to be obtained if it is used in an environment of high temperature and high humidity or in an environment of low temperature and low humidity.

In particular, a tone in which a particle size is made fine can be strongly charged so that a developer exhibiting high image quality and excellent development properties is provided.

According to the present invention, excellent images can be stably obtained which exhibits high density, stable durability and which is free from the transfer hollow even if it is used with a transparence film. Further, the surface of the photosensitive drum is less damaged and, accordingly, the durability of the photosensitive drum can be improved.

Further, according to the present invention, an image forming method using is provided in which a specific fine powder is used in a magnetic developer to impart lubricating characteristics to it and which comprises a charging process for performing charging by bringing the charging member into contact with a member to be charged to apply voltage from outside, and a cleaning process for removing the developer from the foregoing member to be charged, the method enabling high quality images to be obtained because adhesion of the melted toner to the surface of the photosensitive member is inhibited not to cause contamination with the toner.

What is claimed is:

1. A developer for developing an electrostatic image, comprising a toner and treated fine powder which has been treated with silicone oil or silicone varnish, wherein said treated fine powder has a specific surface area which is from 40% to 80% the specific surface area of untreated fine powder.

2. The developer according to claim 1, wherein said treated fine powder has a specific surface area which is from 40% to 60% the specific surface area of untreated fine powder.

3. The developer according to claim 1, wherein said treated fine powder has 3 to 8 wt % of the quantity of carbon adhered due to the silicon oil or silicone vanish treatment.

4. The developer according to claim 1, wherein said treated fine powder is silica fine powder treated with silicone oil.

5. The developer according to claim 1, wherein said treated fine powder has a hydrophobic ratio of 80 or more.

6. The developer according to claim 1, wherein said treated fine powder is prepared by processing fine powder with a silane couping agent expressed by formula $R_3$—Si—Y or $R_2$—Si—$Y_2$ (where Y is a methyl group and R is an alkoxy group or chlorine), followed by processing with hexamethyl disilanzane or a silane coupling agent expressed by formula R—Si—$Y_3$ (where Y is a methyl group and R is an alkoxy group or chlorine), and followed by treating with silicone oil or silicone varnish.

7. The developer according to claim 1, wherein said treated fine powder has an average particle size of 0.001 to 2 $\mu$m as the primary particle size.

8. The developer according to claim 1, wherein said treated fine powder has an average particle size of 0.002 to 0.2 $\mu$m as the primary particle size.

9. The developer according to claim 1, wherein said treated fine powder is hydrophobic silica fine powder prepared by treating silica fine powder with dimethyldichlorosilane, followed by treating with hexamethyldisilanzane, and followed by treating with dimethyl silicone oil.

10. The developer according to claim 1, wherein said treated fine powder is contained by 0.01 to 20 parts by weight with respect to 100 parts by weight of said toner.

11. The developer according to claim 1, wherein said treated fine powder is contained by 0.1 to 3 parts by weight with respect to 100 parts by weight of said toner.

12. An image forming method, comprising the steps of:

charging an electrostatic image carrier;
forming an electrostatic image on the charged electrostatic image carrier;
developing the electrostatic image with a toner to form a toner image; and
transferring the toner image to a transfer medium by transfer means which is being pressed against said electrostatic image carrier under a line pressure of 3 g/cm or more while interposing a transfer member therebetween,
wherein said developer comprises a toner and treated fine powder which has been treated with silicone oil or silicone varnish, said treated fine powder having a specific surface area which is from 40% to 80% the specific area of untreated fine powder.

13. The image forming method according to claim 12, wherein said transfer means is pressed against said electrostatic image carrier under a line pressure of 20 g/cm or more.

14. The image forming method according to claim 12, wherein said transfer means is a transfer roller which is being applied with a bias.

15. The image forming method according to claim 14, wherein said transfer roller has a core and an electroconductive elastic layer.

16. The image forming method according to claim 15, wherein said electroconductive elastic layer has a volume resistance of about $10^6$ to $10^{10}$ $\Omega$·cm.

17. The image forming method according to claim 14, wherein said bias has an electric current value of 0.1 to 50 $\mu$A.

18. The image forming method according to claim 14, wherein said bias has a voltage value of 100 to 5000 V.

19. The image forming method according to claim 12, wherein said treated fine powder has a specific surface area which is from 40% to 60% the specific surface area of untreated fine powder.

20. The image forming method according to claim 12, wherein said treated fine powder has 3 to 8 wt % of the quantity of carbon adhered due to the silicone or silicone varnish treatment.

21. The image forming method according to claim 12, wherein said treated fine powder is silica fine powder treated with said silicone oil.

22. The image forming method according to claim 12, wherein said treated fine powder has a hydrophobic ratio of 80 or more.

23. The image forming method according to claim 12, wherein said treated fine powder is prepared by processing fine powder with a silane coupling agent expressed by formula $R_3$—Si—Y or $R_2$—Si—$Y_2$ (where Y is a methyl group and R is an alkoxy group or chlorine), followed by processing with hexamethyl disilanzane or a silane coupling agent expressed by formula R—Si—$Y_3$ (where Y is a methyl group and R is an alkoxy group or chlorine), and followed by treating with silicone oil or silicone varnish.

24. The image forming method according to claim 12, wherein said treated fine powder has an average particle size of 0.001 to 2 $\mu$m as the primary particle size.

25. The image forming method according to claim 12, wherein said treated fine powder has an average particle size of 0.002 to 0.2 $\mu$m as the primary particle size.

26. The image forming method according to claim 12, wherein said treated fine powder is hydrophobic slica fine powder prepared by processing silica fine powder with dimethyldichlorosilane, followed by processing with hexamethyldisilanzane, and followed by treating with dimethyl silicone oil.

27. The image forming method according to claim 12, wherein said treated fine powder contained by 0.01 to 20 parts by weight with respect to 100 parts by weight of said toner.

28. The image forming method according to claim 12, wherein said processed granules are contained by 0.1 to 3 parts by weight with respect to 100 parts by weight of said toner.

29. An image forming method, comprising the steps of:

bringing a charging member into contact with an electrostatic image carrier;
applying voltage to said charging member from outside to charge the electrostatic image carrier;

forming an electrostatic image on the charged electrostatic image carrier;

forming a toner image by developing the electrostatic image with a developer;

transferring the toner image from the electrostatic image carrier to a transfer medium; and cleaning the transfer electrostatic image carrier, wherein said developer comprises a toner and treated fine powder which has been treated with silicone oil or silicone varnish, said treated fine powder having a specific surface area which is from 40% to 80% the specific area of untreated fine powder.

30. The image forming method according to claim 29, wherein said charging member is a charging roller.

31. The image forming method according to claim 29, wherein said charging member is a charging blade.

32. The image forming method according to claim 29, wherein said charging member is a charging roller having a core, a conductive rubber layer and a release surface layer.

33. The image forming method according to claim 32, wherein said release surface layer has a volume resistance of $10^9$ to $10^{14}$ $\Omega \cdot cm$.

34. The image forming method according to claim 30, wherein said charging roller is being pressed against said electrostatic image carrier under a contact pressure of 5 to 500 g/cm.

35. The image forming method according to claim 29, wherein said treated fine powder has a specific surface area which is from 40% to 60% the specific surface area of untreated fine powder.

36. The image forming method according to claim 29, wherein said treated fine powder has 3 to 8 wt % of the quantity of carbon adhered due to the silicone oil or silicone varnish treatment.

37. The image forming method according to claim 29, wherein said treated fine powder is silica fine powder treated with said silicone oil.

38. The image forming method according to claim 29, wherein said treated fine powder has a hydrophobic ratio of 80 or more.

39. The image forming method according to claim 29, wherein said treated fine powder is prepared by processing fine powder with a silane coupling agent expressed by formula $R_3$—Si—Y or $R_2$—Si—$Y_2$ (where Y is a methyl group and R is an alkoxy group or chlorine), followed by processing with hexamethyl disilanzane or a silane coupling agent expressed by formula R—Si—$Y_3$ (where Y is a methyl group and R is an alkoxy group or chlorine), and followed by treating with silicone oil or silicone varnish.

40. The image forming method according to claim 29, wherein said treated fine powder has an average particle size of 0.001 to 2 μm as the primary particle size.

41. The image forming method according to claim 29, wherein said treated fine powder has an average particle size of 0.002 to 0.2 μm as the primary particle size.

42. The image forming method according to claim 29, wherein said treated fine powder is hydrophobic silica fine powder prepared by processing silica fine powder with dimethyldichlorosilane, followed by processing with hexamethyldisilanzane, and followed by treating with dimethyl silicone oil.

43. The image forming method according to claim 29, wherein said treated fine powder is contained by 0.01 to 20 parts by weight on the basis of 100 parts by weight of said toner.

44. The image forming method according to claim 29, wherein said treated fine powder is contained by 0.1 to 3 parts by weight on the basis of 100 parts by weight of said toner.

* * * * *

UNITED STATES PATENT AND TRADEMARK OFFICE
CERTIFICATE OF CORRECTION

PATENT NO. : 5,447,815
DATED : September 5, 1995
INVENTOR(S) : MASAYOSHI KATO, ET AL.

It is certified that error appears in the above-indentified patent and that said Letters Patent is hereby corrected as shown below:

COLUMN 1

Line 10, "as an" should read --as--.

COLUMN 4

Line 32, "is" should read --are--.

COLUMN 10

Line 50, "valve" should read --value--.

COLUMN 12

Line 1, "disadvantage" should read --disadvantageous--;

Line 11, "enables" should read --enable--;

Line 14, "a" should read --an--;

Line 21, "to damage generated" should read --and causes damage--; and

Line 53, "is" should read --are--.

COLUMN 14

Line 33, "an" should read --a--; and

Line 51, "drived" should read --driven--.

COLUMN 15

Line 36, "shows" should read --show--.

UNITED STATES PATENT AND TRADEMARK OFFICE
CERTIFICATE OF CORRECTION

PATENT NO. : 5,447,815
DATED : September 5, 1995
INVENTOR(S) : MASAYOSHI KATO, ET AL.

It is certified that error appears in the above-indentified patent and that said Letters Patent is hereby corrected as shown below:

COLUMN 17

Line 24, "Tables 1-2" should read --Tables 1-1--.

COLUMN 18

Table 1-2, should read as follows:

--

Table 1-2

| | Additive (silica) | Transfer hollow | | | |
|---|---|---|---|---|---|
| | Quantity of addition (parts/ 100 parts) | Density of image | Thick paper | Transparency film | State of surface of OPC drum |
| Example 1 | 1 | ○ | ⊚ | ⊚ | ⊚ |
| Example 2 | 0.8 | ○ | ○ | ○ | ○ |
| | 1.2 | ○ | ○ | ○ | ○ |
| | 1.5 | ○ | ○ | ○ | △ |
| Example 3 | 1.2 | ○ | ○ | ○ | △ |
| Example 4 | 0.8 | △ | ○ | ○ | △ |
| Example 5 | 0.8 | ○ | ○ | ○ | ○ |
| Comparative Example 1 | 0.8 | × | △ | × | △ |

--

UNITED STATES PATENT AND TRADEMARK OFFICE
CERTIFICATE OF CORRECTION

PATENT NO. : 5,447,815
DATED : September 5, 1995
INVENTOR(S) : MASAYOSHI KATO, ET AL.

Page 3 of 5

It is certified that error appears in the above-indentified patent and that said Letters Patent is hereby corrected as shown below:

COLUMN 20

Line 23, "time" should be deleted; and

Line 42, "time" should be deleted.

COLUMN 21

Table 2-2, "66" should read --Δ--.

COLUMN 22

Line 45, "hexamethyldisilanzane," should read --hexamethyldisilazane,--; and

Line 58, "time" should be deleted.

COLUMN 25

Line 6, "87%," should read --87.2%,--;

Line 38, "performes" should read --performed--; and

Line 58, "92%," should read --92.6%,--.

COLUMN 28

Line 29, "test," should read --tests,--;

Line 30, "al" should read --al- --;

Line 48, "part s" should read --parts--; and

Line 55, "Tests" should read --tests--.

UNITED STATES PATENT AND TRADEMARK OFFICE
CERTIFICATE OF CORRECTION

PATENT NO. : 5,447,815
DATED : September 5, 1995
INVENTOR(S) : MASAYOSHI KATO, ET AL.

It is certified that error appears in the above-indentified patent and that said Letters Patent is hereby corrected as shown below:

COLUMN 29

Line 8, "were" should read --was--; and

Line 18, "of" should be deleted.

COLUMN 31

Example 30, "dimetyl" should read --dimethyl--.

COLUMN 34

Line 47, "tone" should read --toner--;

Line 52, "exhibits" should read --exhibit--; and

Line 54, "transparence" should read --transparency--.

COLUMN 35

Line 16, "silicon" should read --silicone--; and "vanish" should read --varnish--;

Line 29, "disilanzane" should read --disilazane--; and

Line 57, "toner" should read --developer--.

COLUMN 36

Line 38, "disilanzane" should read --disilazane--;

Line 53, "hexamethyldisilanzane," should read --hexamethyldisilazane,--; and

UNITED STATES PATENT AND TRADEMARK OFFICE
CERTIFICATE OF CORRECTION

PATENT NO. : 5,447,815
DATED : September 5, 1995
INVENTOR(S) : MASAYOSHI KATO, ET AL.

It is certified that error appears in the above-indentified patent and that said Letters Patent is hereby corrected as shown below:

<u>COLUMN 36, Cont'd.</u>
  Line 56, "contained" should read --is contained--.
<u>COLUMN 38</u>
  Line 12, "disilanzane" should read --disilazane--.

Signed and Sealed this

Thirtieth Day of April, 1996

Attest:

BRUCE LEHMAN

*Attesting Officer*   *Commissioner of Patents and Trademarks*